US008158213B2

(12) United States Patent
Inaba et al.

(10) Patent No.: US 8,158,213 B2
(45) Date of Patent: Apr. 17, 2012

(54) AQUEOUS POLYMERIZABLE MONOMER COMPOSITION, GAS BARRIER FILM AND PRODUCTION PROCESS OF THE FILM

(75) Inventors: Yusaku Inaba, Ibaraki (JP); Masayuki Okura, Ibaraki (JP); Mototaka Kawashima, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 701 days.

(21) Appl. No.: 11/792,051

(22) PCT Filed: Nov. 30, 2005

(86) PCT No.: PCT/JP2005/022399
§ 371 (c)(1), (2), (4) Date: Jun. 1, 2007

(87) PCT Pub. No.: WO2006/059773
PCT Pub. Date: Jun. 8, 2006

(65) Prior Publication Data

US 2008/0090018 A1 Apr. 17, 2008

(30) Foreign Application Priority Data

Dec. 1, 2004 (JP) ................................ 2004-349002

(51) Int. Cl.
*B05D 3/06* (2006.01)
*C08F 2/10* (2006.01)
*C08F 2/46* (2006.01)

(52) U.S. Cl. ........ 427/487; 427/493; 427/496; 427/508; 526/91; 526/103; 526/172

(58) Field of Classification Search .................. 427/487, 427/493, 496, 508; 526/103, 172, 91
See application file for complete search history.

(56) References Cited

U.S. PATENT DOCUMENTS 3,067,180 A * 12/1962 Miller et al. ............... 525/329.3
4,072,528 A * 2/1978 Bratt ............................ 430/556
4,562,234 A * 12/1985 Besecke et al. ............... 526/241
5,739,232 A 4/1998 Hazell et al.
6,218,465 B1 * 4/2001 Kobayashi et al. ........... 524/847
6,361,925 B1 * 3/2002 Leppard et al. ............ 430/281.1
6,831,142 B2 12/2004 Mertens et al.
7,476,712 B2 * 1/2009 Tanaka et al. .............. 525/330.2
2001/0053804 A1 12/2001 Widmer et al.
2002/0019329 A1 2/2002 Hammi et al.

FOREIGN PATENT DOCUMENTS

JP 51-141808 5/1975
JP 02048944 A * 2/1990
JP 03021603 A * 11/1994
JP 06089050 B2 * 11/1994
JP 08-053389 2/1995
JP 2002-003256 3/2001
JP 2002-080502 6/2001
JP 2003-057185 8/2001
JP 2003-128804 10/2001
JP 2003-286349 1/2002
WO WO 02/20068 A1 6/2001

OTHER PUBLICATIONS

International Search Report for PCT/JP2005/022399, dated Mar. 14, 2006.

* cited by examiner

*Primary Examiner* — Elena T Lightfoot
(74) *Attorney, Agent, or Firm* — Porter Wright Morris & Arthur

(57) ABSTRACT

An aqueous polymerizable monomer composition including an α,β-unsaturated carboxylic acid monomer and a polyvalent metal ion in an amount sufficient to neutralize 10 to 90% of a carboxyl group of the α,β-unsaturated carboxylic acid monomer in the form of a solution or dispersion in water in an amount of 20 to 85% by weight based on the whole amount of the composition, a gas barrier film including an ionically crosslinked polycarboxylic acid polymer film formed by subjecting a coating film of the aqueous polymerizable monomer composition to a polymerization treatment and having an oxygen transmission rate of at most $50\times10^{-4}$ $cm^3(STP)/(m^2\cdot s\cdot MPa)$ as measured under conditions of a temperature of 30° C. and a high relative humidity of 80%, and a production process of the film.

25 Claims, No Drawings

AQUEOUS POLYMERIZABLE MONOMER COMPOSITION, GAS BARRIER FILM AND PRODUCTION PROCESS OF THE FILM

Related Application: This application is a 371 National Stage of International Application No. PCT/JP05/22399, filed Nov. 30, 2005.

TECHNICAL FIELD

The present invention relates to a single-layer or multi-layer gas barrier film excellent in gas barrier properties such as oxygen gas barrier property and suitable for use as packaging materials for food packaging and the like, and an aqueous polymerizable monomer composition used in the production of the film.

BACKGROUND ART

Some proposals have been made on a process for producing a film improved in gas barrier properties, hot water resistance and water vapor resistance by introducing an ionic bond between poly(meth)acrylic acid and a metal. The poly(meth) acrylic acid means polyacrylic acid, polymethacrylic acid or a mixture thereof.

There has been proposed, for example, a process for producing a gas barrier film improved in hot water resistance and water vapor resistance by subjecting a coating film formed of a mixture of poly(meth)acrylic acid and polyvinyl alcohol or a saccharide to a heat treatment to form a film and then subjecting the film to a dipping treatment in a medium containing an alkaline metal or alkaline earth metal to introduce an ionic bond between poly(meth)acrylic acid and the metal (U.S. Pat. No. 6,022,913; Document 1).

There has been proposed a process for producing a film excellent in gas barrier properties, hot water resistance and water vapor resistance by forming a metal compound-containing layer on the surface of a coating film formed from a mixture of poly(meth)acrylic acid or a partially neutralized product thereof and polyvinyl alcohol or a saccharide and forming an ionic bond by migration of the metal compound into the coating film (U.S. Pat. No. 6,605,344; Document 2).

According to the processes described in Documents 1 and 2, however, it is necessary to subject the coating film containing the mixture to a heat treatment over a relatively long period of time at a high temperature of at least 100° C. for obtaining a gas barrier film. In addition, the method for forming the ionic bond is complicated in these processes.

There has recently been proposed a process for forming a polyvalent metal salt of a polycarboxylic acid by a reaction of a carboxyl group of a polycarboxylic acid polymer and a polyvalent metal compound by forming a multi-layer film with a layer of the polycarboxylic acid polymer and a layer containing the polyvalent metal compound arranged adjacently to each other and put the multi-layer film under an atmosphere of a relative humidity of at least 20%, thereby causing a polyvalent metal ion to migrate into the polycarboxylic acid polymer layer from the polyvalent metal compound-containing layer (U.S. Patent Application Publication No. 2005/0131162; Document 3). According to this process, a film excellent in gas barrier properties can be obtained.

However, the process described in Document 3 requires a step of synthesizing the polycarboxylic acid polymer by polymerizing an α,β-unsaturated carboxylic acid monomer such as (meth)acrylic acid; a step of applying a coating liquid containing the polycarboxylic acid polymer and a step of applying a coating liquid containing the polyvalent metal compound, and so the operation is complicated. In addition, this process requires putting the multi-layer film over a long period of time under a high-humidity atmosphere for causing the polyvalent metal ion to migrate into the polycarboxylic acid polymer layer from the polyvalent metal compound-containing layer, and so it is difficult to continuously operate the process.

Document 3 also discloses a process for producing a gas barrier film by applying and drying an aqueous coating liquid containing a mixture of a polycarboxylic acid polymer and a polyvalent metal compound. However, the polycarboxylic acid polymer and the polyvalent metal compound are easy to react in an aqueous solution to cause insoluble precipitate, and so it is difficult to prepare an aqueous coating liquid with the respective component uniformly dissolved therein. When a volatile amine such as aqueous ammonia is added upon the preparation of the aqueous coating liquid, the reaction between the polycarboxylic acid polymer and the polyvalent metal compound can be inhibited. Since there is a need of volatilizing off the volatile amine after the application of the aqueous coating liquid, however, a working environment may possibly be adversely affected.

DISCLOSURE OF THE INVENTION

It is an object of the present invention to provide a single-layer or multi-layer gas barrier film including an ionically crosslinked polycarboxylic acid polymer film excellent in gas barrier properties.

Another object of the present invention is to provide an aqueous polymerizable monomer composition suitable for use as a raw material for producing the ionically crosslinked polycarboxylic acid polymer film.

A further object of the present invention is to provide a production process, by which a single-layer or multi-layer gas barrier film including the ionically crosslinked polycarboxylic acid polymer film can be produced by a simple process using the aqueous polymerizable monomer composition.

The present inventors have carried out an extensive investigation with a view toward achieving the above objects. As a result, the inventors have conceived an aqueous polymerizable monomer composition comprising an α,β-unsaturated carboxylic acid monomer and a polyvalent metal ion in an amount sufficient to neutralize 10 to 90% of a carboxyl group of the α,β-unsaturated carboxylic acid monomer in the form of a solution or dispersion in water in an amount of 20 to 85% by weight based on the whole amount of the composition.

When the aqueous polymerizable monomer composition is applied as a coating liquid on to a base material, a uniform coating film can be formed. It has been found that when the coating film in a wet state is subjected to a polymerization treatment by a method of exposing the film to an ionizing radiation and/or a method of subjecting the film to a heat treatment, a cured coating film is obtained without causing problems of precipitation of gel and whitening of the film. This cured coating film is an ionically crosslinked polycarboxylic acid polymer film excellent in oxygen gas barrier property.

The production process according to the present invention is a process, in which the α,β-unsaturated carboxylic acid monomer is polymerized in the presence of the polyvalent metal ion, thereby conducting the formation of a polycarboxylic acid polymer and ionic crosslinking at the same time, unlike the conventional processes, in which the polycarboxylic acid polymer film is subjected to ionic crosslinking (ionic bonding), and so the production process can greatly simplify the production step of the film, and is suitable for continuous production.

The cured coating film obtained by the production process of the present invention is an ionically crosslinked polycarboxylic acid polymer film of a structure that the polycarboxylic acid polymer formed by the polymerization of the α,β-unsaturated carboxylic acid is ionically crosslinked with the polyvalent metal ion. The ionically crosslinked polycarboxylic acid polymer film according to the present invention is excellent in gas barrier properties such as oxygen gas barrier property. Since the ionically crosslinked polycarboxylic acid polymer film according to the present invention is ionically crosslinked with the polyvalent metal ion, the appearance, form and gas barrier properties thereof are not impaired under ordinary use conditions when the film is used as a single-layer or multi-layer gas barrier film in an application field of packaging materials.

The aqueous polymerizable monomer composition is applied on to a base material 1 to form a coating film in a wet state, the surface of the coating film is covered with another base material 2, and the coating film between the base material 1 and the base material 2 is subjected to an exposure treatment to an ionizing radiation and/or a heat treatment while retaining the wet state of the coating film, whereby a gas barrier multi-layer film having good interlayer adhesion can be obtained. A multi-layer film having various functions can be obtained by selecting the kinds of the base material 1 and the base material 2 and arranging an additional layer.

The present invention has been led to completion on the basis of these findings.

According to the present invention, there is provided an aqueous polymerizable monomer composition comprising an α,β-unsaturated carboxylic acid monomer and a polyvalent metal ion in an amount sufficient to neutralize 10 to 90% of a carboxyl group of the α,β-unsaturated carboxylic acid monomer in the form of a solution or dispersion in water in an amount of 20 to 85% by weight based on the whole amount of the composition.

According to the present invention, there is also provided a gas barrier film comprising an ionically crosslinked polycarboxylic acid polymer film formed by subjecting a coating film of the aqueous polymerizable monomer composition to a polymerization treatment and having an oxygen transmission rate of at most $50\times10^{-4}$ $cm^3(STP)/(m^2\cdot s\cdot MPa)$ as measured under conditions of a temperature of 30° C. and a high relative humidity of 80%.

The gas barrier film according to the present invention may be a single layer of the ionically crosslinked polycarboxylic acid polymer film or may be a multi-layer gas barrier film having a layer structure of "base material/ionically crosslinked polycarboxylic acid polymer film" or "base material 1/ionically crosslinked polycarboxylic acid polymer film/base material 2". Various kinds of additional layers may be provided on the single-layer or multi-layer gas barrier film according to the present invention by a laminating method, coating method or the like for the purpose of giving various functions to the film.

According to the present invention, there is further provided a process for producing a gas barrier film, comprising the following Steps 1 and 2:

(1) Step 1 of applying the above-mentioned aqueous polymerizable monomer composition on to a base material to form a coating film in a wet state; and (2) Step 2 of subjecting the coating film in the wet state to a treatment by exposure to an ionizing radiation or heating or both of them to polymerize the α,β-unsaturated carboxylic acid monomer and at the same time to ionically crosslink the polymer formed with the polyvalent metal ion, thereby forming an ionically crosslinked polycarboxylic acid polymer film having an oxygen transmission rate of at most $50\times10^{-4}$ $cm^3(STP)/(m^2\cdot s\cdot MPa)$ as measured under conditions of a temperature of 30° C. and a high relative humidity of 80%.

BEST MODE FOR CARRYING OUT THE INVENTION

1. α,β-Unsaturated Carboxylic Acid Monomer:

The α,β-unsaturated carboxylic acid monomer used in the present invention is an unsaturated carboxylic acid compound of a structure that a carboxyl group is bonded to at least one carbon atom of two carbon atoms forming a carbon-carbon double bond of an unsaturated carboxylic acid. Since the carbon-carbon double bond is an ethylenic double bond, this unsaturated carboxylic acid has a function of a polymerizable monomer.

The α,β-unsaturated carboxylic acid monomer used in the present invention may be generally divided into an unsaturated monocarboxylic acid having one carboxyl group and an unsaturated dicarboxylic acid having two carboxylic groups. The unsaturated dicarboxylic acid includes a carboxylic acid of a structure that a carboxyl group is bonded to each of two carbon atoms forming an ethylenic carbon-carbon double bond, and a carboxylic acid of a structure that a carboxyl group is bonded to one carbon atom of two carbon atoms forming an ethylenic carbon-carbon double bond, and a carboxyl group is bonded to any other carbon atom. The α,β-unsaturated carboxylic acid may have another carbon-carbon double bond in addition to the ethylenic carbon-carbon double bond.

The α,β-unsaturated carboxylic acid monomer used in the present invention includes at least one unsaturated carboxylic acid selected from the group consisting of, for example, acrylic acid, methacrylic acid, crotonic acid, cinnamic acid, senecioic acid, tiglic acid, sorbic acid, maleic acid, fumaric acid, itaconic acid, citraconic acid, mesaconic acid and acid anhydrides thereof.

Among these, acrylic acid, methacrylic acid, crotonic acid, cinnamic acid, senecioic acid (i.e., β,β-dimethylacrylic acid) and tiglic acid (i.e., 2-methylcrotonic acid) are α,β-monoethylenically unsaturated monocarboxylic acids. Sorbic acid is an α,β-unsaturated monocarboxylic acid, but has 2 carbon-carbon double bonds. Both cis form and trans form may be used as cinnamic acid.

Maleic acid, fumaric acid, itaconic acid, citraconic acid and mesaconic acid are α,βmonoethylenically unsaturated dicarboxylic acids. As the acid anhydrides, are preferred maleic anhydride, itaconic anhydride and citraconic anhydride. However, these acid anhydrides are often in the form of a free acid in the aqueous polymerizable monomer composition.

The α,β-unsaturated carboxylic acid monomer used as a raw material may be in the form of such an α,β-unsaturated carboxylic acid monomer as described above, but may be in the form of a polyvalent metal salt of the α,β-unsaturated carboxylic acid monomer. In the polyvalent metal salt of the α,β-unsaturated carboxylic acid monomer, however, the carboxyl group of the α,β-unsaturated carboxylic acid monomer is completely neutralized by the polyvalent metal salt, and so the amount of a polyvalent metal ion becomes excessive when such a metal salt is used by itself. Therefore, when the polyvalent metal salt of the α,β-unsaturated carboxylic acid monomer is used, the metal salt is used in combination with the α,β-unsaturated carboxylic acid monomer to control the amount of the polyvalent metal ion present in the aqueous polymerizable monomer composition so as to become an amount sufficient to neutralize 10 to 90% of the carboxyl group of the α,β-unsaturated carboxylic acid monomer.

As the α,β-unsaturated carboxylic acid monomer, is preferred acrylic acid, methacrylic acid, cinnamic acid, senecioic acid, tiglic acid, sorbic acid, itaconic acid, maleic acid or citraconic acid. Acrylic acid or methacrylic acid is more preferred, with acrylic acid being particularly preferred from the viewpoints of properties such as gas barrier properties and cost. Other monomers than (meth)acrylic acid, such as itaconic acid, citraconic acid and maleic acid are preferably used as a minor-amount component of less than 50% by weight in combination with acrylic acid or methacrylic acid. The α,β-unsaturated carboxylic acid monomers may be used either singly or in any combination thereof.

2. Polyvalent Metal Ion:

The polyvalent metal ion is a polyvalent metal ion derived from a polyvalent metal compound. As the polyvalent metal compound, is generally used a compound that dissociates in water to form a polyvalent metal ion. The polyvalent metal compound is a simple substance or polyvalent metal compound of a polyvalent metal atom, whose metal ion has a di or higher valence. Accordingly, the polyvalent metal compounds used in the present invention also include simple substances of polyvalent metal atoms.

As examples of polyvalent metals, may be mentioned metals of Group 2A of the periodic table, such as beryllium, magnesium and calcium; transition metals such as titanium, zirconium, chromium, manganese, iron, cobalt, nickel, copper and zinc; and aluminum. However, the polyvalent metals are not limited thereto. Among these, zinc, calcium, copper, magnesium, aluminum and iron are preferred. The solubility of an α,β-unsaturated carboxylic acid metal salt in water varies according to the kind of the metal used, and so zinc and calcium are particularly preferred as polyvalent metal from the viewpoint of solubility.

Specific examples of the polyvalent metal compound include oxides, hydroxides, carbonates, organic acid salts and inorganic acid salts of the polyvalent metals. However, the polyvalent metal compounds are not limited thereto. As oxides of the polyvalent metals, are preferred zinc oxide, magnesium oxide and iron(III) oxide.

Examples of the organic acid salts include acetates, oxalates, citrates, lactates, phosphates, phosphites, hypophosphites, stearates and α,β-monoethylenically unsaturated carboxylates. However, the organic acid salts are not limited thereto. Examples of the α,β-monoethylenically unsaturated carboxylates include zinc diacrylate, calcium diacrylate, magnesium diacrylate, copper diacrylate and aluminum acrylate.

Examples of the inorganic acid salts include chlorides, sulfates and nitrates. However, the inorganic acid salts not limited thereto. Alkylalkoxides of polyvalent metals may also be used as the polyvalent metal compounds. These polyvalent metal compounds may be used either singly or in any combination thereof.

Among the polyvalent metal compounds, compounds of beryllium, magnesium, calcium, copper, cobalt, nickel, zinc, aluminum, iron and zirconium are preferred from the viewpoints of dispersion stability of the resulting aqueous polymerizable monomer composition (coating liquid) and the gas barrier properties of a film to be formed from the aqueous polymerizable monomer composition, with compounds of divalent metals such as beryllium, magnesium, calcium, copper, zinc, cobalt and nickel; and compounds of trivalent metals such as iron and aluminum being more preferred.

As preferable examples of divalent metal compounds, may be mentioned oxides such as zinc oxide, magnesium oxide, copper oxide, nickel oxide and cobalt oxide; carbonates such as calcium carbonate; organic acid salts such as calcium lactate, zinc lactate, zinc diacrylate, calcium diacrylate, magnesium diacrylate and copper diacrylate; and alkoxides such as magnesium methoxide. However, the divalent metal compounds are not limited thereto. As examples of trivalent metal compounds, may be mentioned oxides such as iron(III) oxide; and organic acid salts such as aluminum acrylate. The polyvalent metal compound is used in the form of an aqueous solution or aqueous dispersion. The polyvalent metal compounds may be used either singly or in any combination thereof.

3. Aqueous Polymerizable Monomer Composition:

The aqueous polymerizable monomer composition according to the present invention is used as a coating liquid applied on to a base material upon the production of the ionically crosslinked polycarboxylic acid polymer film by the coating method.

The aqueous polymerizable monomer composition according to the present invention is a composition comprising an α,β-unsaturated carboxylic acid monomer and a polyvalent metal ion in an amount sufficient to neutralize 10 to 90% of a carboxyl group of the α,β-unsaturated carboxylic acid monomer in the form of a solution or dispersion in water in an amount of 20 to 85% by weight based on the whole amount of the composition. As the α,β-unsaturated carboxylic acid monomer, is used at least one of the α,β-unsaturated carboxylic acids mentioned above. As a source of the polyvalent metal ion, is used such a polyvalent metal compound as mentioned above, which dissociates into a polyvalent metal ion in water.

The polyvalent metal ion is used in an amount sufficient to neutralize 10 to 90%, preferably 15 to 87%, more preferably 20 to 85% of the carboxyl group of the α,β-unsaturated carboxylic acid monomer. This percentage is referred to as a degree of neutralization. The lower limit value of the degree of neutralization may be raised to 25%, further 30% or 40%. The quantitative ratio of the polyvalent metal ion to the α,β-unsaturated carboxylic acid monomer is 0.10 to 0.90, preferably 0.15 to 0.87, more preferably 0.20 to 0.85 in terms of a chemical equivalent to the carboxyl group of the α,β-unsaturated carboxylic acid monomer. The lower limit value of this chemical equivalent may be raised to 0.25, further 0.30 or 0.40.

If the chemical equivalent of the polyvalent metal ion to the carboxyl group of the α,β-unsaturated carboxylic acid monomer is too low, and the degree of neutralization becomes too low, the gas barrier properties under high-humidity conditions of a film to be formed are deteriorated. If the chemical equivalent of the polyvalent metal ion to the carboxyl group of the α,β-unsaturated carboxylic acid monomer is too high, and the degree of neutralization becomes too high, the solubility of the metal ion is lowered to fail to provide a uniform aqueous polymerizable monomer composition, the polymerization reactivity of the resulting coating film in a wet state is lowered, or a film formed is whitened. The amount of the polyvalent metal ion and the degree of neutralization are preferably controlled in view of the kind of the α,β-unsaturated carboxylic acid monomer used and the kind and valence of the polyvalent metal compound.

An ion of a monovalent metal such as sodium or potassium may be contained in the aqueous polymerizable monomer composition according to the present invention within limits not impairing uniformity as a solution.

The aqueous polymerizable monomer composition according to the present invention contains water in an amount of 20 to 85% by weight based on the whole amount of the composition. If the content of water is too low, it is difficult to uniformly dissolve or disperse the α,β-unsaturated carboxylic acid monomer and the polyvalent metal compound. The α,β-unsaturated carboxylic acid monomer and the polyvalent metal compound are preferably uniformly dissolved in the aqueous polymerizable monomer composition. If an undissolved polyvalent metal compound is present in a great amount in the aqueous polymerizable monomer composition in particular, it is difficult to obtain a uniform film. If the content of water is too high on the other hand, gel precipitates in the step of polymerizing the coating film in the wet state to lower the appearance of the resulting film, or difficulty is encountered upon the removal of water after the polymerization.

The content of water varies according to the solubility of the polyvalent metal compound used in water. However, the content is preferably 25 to 83% by weight, more preferably 28 to 82% by weight based on the whole amount of the composition. The content of water is preferably controlled to 30 to 70% by weight for balancing the polymerization reactivity of the coating film in the wet state with the removal efficiency of water after the polymerization.

The solid content concentration in the aqueous polymerizable monomer composition according to the present invention is 15 to 80% by weight, preferably 17 to 75% by weight, more preferably 18 to 72% by weight. The term "solid content concentration" in the present invention means % by weight of other components (total amount) than water. In order to control the content of water to 30 to 70% by weight, the solid content concentration is controlled within a range of 70 to 30% by weight. Upon the preparation of the aqueous polymerizable monomer composition, water may be formed by a reaction of the α,β-unsaturated carboxylic acid monomer with the polyvalent metal compound. In such a case, the content of water in the aqueous polymerizable monomer composition according to the present invention is calculated out in view of the water resulting from the reaction of the α,β-unsaturated carboxylic acid monomer with the polyvalent metal compound.

The aqueous polymerizable monomer composition according to the present invention uses water as a solvent. However, a small amount of an organic solvent (for example, an alcohol) may be added within limits not impeding the polymerization reaction.

4. Other Component

A polymerization initiator may be contained in the aqueous polymerizable monomer composition according to the present invention as needed. A photo-polymerization initiator and a heat-polymerization initiator are representative of the polymerization initiator. The photo-polymerization initiator and the heat-polymerization initiator may be used in combination. The photo-polymerization initiator also includes azo compounds and peroxides activated by exposure to an ionizing radiation.

When the coating film in the wet state is exposed to ultraviolet light, the photo-polymerization initiator is preferably contained in the aqueous polymerizable monomer composition. The photo-polymerization initiator may be called a photo-initiator or sensitizer merely. Examples of the photo-polymerization initiator include acetophenones, benzophenones, Michler's ketones, benzyls, benzoins, benzoin ethers, benzyl dimethyl ketals, thioxanthones and mixtures of two or more compounds thereof.

As specific examples of the photo-polymerization initiator, may be mentioned carbonyl compounds, such as acetophenones such as acetophenone, 2,2-diethoxy-acetophenone, m-chloroacetophenone, p-tert-butyl-trichloroacetophenone and 4-dialkylacetophenones; benzophenones such as benzophenone; Michler's ketones such as Michler's ketone; benzyls such as benzyl and benzyl methyl ether; benzoins such as benzoin and 2-methylbenzoin; benzoin ethers such as benzoin methyl ether, benzoin ethyl ether, benzoin isopropyl ether and benzoin butyl ether; benzyl dimethyl ketals such as benzyl dimethyl ketal; thioxanthones such as thioxanthone; and propiophenone, anthraquinone, acetoin, butyroin, toluoin, benzoyl benzoate and α-acyloxime esters.

Examples of the photo-polymerization initiators include sulfur compounds such as tetramethylthiuram disulfide, tetraethylthiuram disulfide, tetramethylthiuram monosulfide, thioxanthone and 2-chlorothioxanthone; azo compounds such as azobisisobutylonitrile and azobis-2,4-dimethylvaleronitrile; and peroxides such as benzoyl peroxide and di-tert-butyl peroxide in addition to the carboxyl compounds mentioned above.

When these photo-polymerization initiators are added to the aqueous polymerizable monomer composition, they are added in a proportion of generally 0.001 to 10% by weight, preferably 0.01 to 5% by weight into the aqueous polymerizable monomer composition. The photo-polymerization initiator is not necessarily added. When polymerization is conducted by exposure to ultraviolet light, however, the photo-polymerization initiator is preferably added for the purpose of raising the polymerization efficiency. When a hydrogen-abstracting photo-polymerization initiator such as benzophenone is used, a part of the α,β-unsaturated carboxylic acid monomer can be grafted on a plastic film used as the base material to enhance the interlayer adhesion between the base material and the resulting ionically crosslinked polycarboxylic acid polymer film layer. General-purpose additives such as other sensitizers and light stabilizers may also be added together with the photo-polymerization initiator.

When the coating film in the wet state is heated to perform heat polymerization, a heat-polymerization initiator that undergoes thermal dissociation to exhibit a function as an initiator is preferably used. Examples of the heat-polymerization initiator include persulfates such as potassium persulfate and ammonium persulfate; azo polymerization initiators such as 2,2'-azobis[2-methyl-N-(2-hydroxyethyl)propionamide], 2,2'-azobis[2-methyl-N-[1,1-bis(hydroxymethyl)ethyl]propionamide], 2,2'-azobis(4-methoxy-2,4-dimethylvaleronitrile), 4,4'-azobis(4-cyanovaleric acid), 2,2'-azobis(methyl isobutyrate), 1,2'-azobis(N,N'-dimethyleneisobutylamidine)dihydrochloride, 2,2'-azobis[2-methyl-N-(2-hydroxyethyl)-propionamide and 1,1'-azobis(cyclohexane-1-carbonitrile); hydroperoxides such as tert-alkylhydroperoxides; and peroxides such as di-tert-butyl peroxide, dicumyl peroxide, lauroyl peroxide, benzoyl peroxide, tert-butyl peroxy-2-ethylhexanoate, tert-hexyl peroxy-2-ethylhexanoate, tert-butyl peroxypivalate, di-isopropyl peroxydicarbonate, di-tert-butyl peroxy-isophthalate, 1,1',3,3'-tetramethylbutyl peroxy-2-ethylhexanoate and tert-butyl peroxybutyrate. When the heat-polymerization initiator is used, the initiator is added in a proportion of generally 0.001 to 10% by weight, preferably 0.01 to 5% by weight into the aqueous polymerizable monomer composition.

Other polymers (for example, polyvinyl alcohol, polyethylene glycol, polypropylene glycol and chitosan), glycerol, thickeners, inorganic lamellar compounds, dispersants, surfactants, softening agents, heat stabilizers, antioxidants, oxygen absorbers, colorants, anti-blocking agents, polyfunctional monomers, etc. may be contained in the aqueous polymerizable monomer composition according to the present invention within limits not impeding the polymerization of the α,β-unsaturated carboxylic acid monomer and the ionically crosslinking reaction with the polyvalent metal ion.

Examples of the polyfunctional monomers include polyfunctional (meth)acrylates, such as diacrylates such as diethylene glycol diacrylate, neopentyl glycol diacrylate, polyethylene glycol 400 diacrylate, 1,3-butanediol diacrylate, 1,4-butanediol diacrylate, 1,6-hexanediol diacrylate, diethylene glycol diacrylate, hydroxypivalic ester neopentyl diacrylate, tripropylene glycol diacrylate, dicyclopentenyl acrylate, dicyclopentenyloxyethyl acrylate, 1,4-butanediol diglycidyl ether diacrylate, diethylene glycol diglycidyl ether diacrylate and dipropylene glycol diglycidyl ether diacrylate; dimethacrylates such as ethylene glycol dimethacrylate and dipropylene glycol dimethacrylate; triacrylates such as trimethylolpropane triacrylate and pentaerythritol triacrylate; trimethacrylates such as trimethylolethane trimethacrylate and trimethylolpropane trimethacrylate; and acrylates having at least 4 functionalities such as dipentaerythritol hexaacrylate and polymethylolpropane polyacrylate.

The aqueous polymerizable monomer composition according to the present invention can provide an ionically crosslinked polycarboxylic acid polymer film having good water resistance, hot water resistance and water vapor resistance without adding the polyfunctional monomer. When there is need of enhancing the degree of crosslinking, however, the polyfunctional monomer may be added within a range of a small amount. The polyfunctional monomer is used in a proportion of preferably at most 30 parts by weight, more preferably at most 20 parts by weight, particularly preferably at most 10 parts by weight per 100 parts by weight of the α,β-unsaturated carboxylic acid monomer. When the polyfunctional monomer is used, the lower limit value of the amount used is preferably 0.001 part by weight per 100 parts by weight of the α,β-unsaturated carboxylic acid monomer.

In order to control the degree of crosslinking of the ionically crosslinked polycarboxylic acid polymer, a monofunctional acrylic ester or methacrylic ester such as 2-ethylhexyl acrylate or 2-hydroxyethyl acrylate may also be used in a proportion of a small amount. In addition, a photo-polymerizable prepolymer may be added in a proportion of a small amount to control of the viscosity of the resulting aqueous polymerizable monomer composition.

5. Production Process of Gas Barrier Film:

In the present invention, the gas barrier film is produced by a process comprising the following Steps 1 and 2:

(1) Step 1 of applying the above-mentioned aqueous polymerizable monomer composition on to a base material to form a coating film in a wet state; and (2) Step 2 of subjecting the coating film in the wet state to a treatment by exposure to an ionizing radiation or heating or both of them to polymerize the α,β-unsaturated carboxylic acid monomer and at the same time to ionically crosslink the polymer formed with the polyvalent metal ion, thereby forming an ionically crosslinked polycarboxylic acid polymer film having an oxygen transmission rate of at most $50\times10^{-4}$ $cm^3(STP)/(m^2\cdot s\cdot MPa)$ as measured under conditions of a temperature of 30° C. and a high relative humidity of 80%.

The aqueous polymerizable monomer composition is an aqueous polymerizable monomer composition comprising an α,β-unsaturated carboxylic acid monomer and a polyvalent metal ion in an amount sufficient to neutralize 10 to 90% of a carboxyl group of the α,β-unsaturated carboxylic acid monomer in the form of a solution or dispersion in water in an amount of 20 to 85% by weight based on the whole amount of the composition.

The ionically crosslinked polycarboxylic acid polymer film obtained by the production process according to the present invention has an oxygen transmission rate of at most $50\times10^{-4}$ $cm^3(STP)/(m^2\cdot s\cdot MPa)$ as measured under conditions of a temperature of 30° C. and a high relative humidity of 80% and excellent oxygen gas barrier properties.

After Step 2, a multi-layer gas barrier film having a layer structure of "base material/ionically crosslinked polycarboxylic acid polymer film" is obtained. When a step of separating the base material from the ionically crosslinked polycarboxylic acid polymer film is arranged after Step 2, a single-layer gas barrier film composed of the ionically crosslinked polycarboxylic acid polymer film can be obtained.

Various additional steps may be arranged in each of the respective steps, between the respective steps or after Step 2 as needed. "The step of separating the base material from the ionically crosslinked polycarboxylic acid polymer film" is also an additional step.

As a preferable additional step, may be mentioned, for example, a step of covering the surface of the coating film with another base material 2 after the coating film in the wet state is formed on the base material 1. By this additional step, the wet state of the coating film can be effectively retained between the base material 1 and the base material 2. In addition, a multi-layer film having a layer structure of "base material 1/ionically crosslinked polycarboxylic acid polymer film/base material 2" can be obtained by this additional step.

After Step 2, an additional step of separating at least one of the base material 1 and the base material 2 from the multi-layer film having the layer structure of "base material 1/ionically crosslinked polycarboxylic acid polymer film/base material 2" may also be arranged. By this additional step, a multi-layer gas barrier film having a layer structure of the single layer of the ionically crosslinked polycarboxylic acid polymer film, "base material 1/ionically crosslinked polycarboxylic acid polymer film" or "crosslinked polycarboxylic acid polymer film/base material 2" can be obtained.

As a further additional step, may be mentioned a step of forming a further layer on at least one surface of the multi-layer gas barrier film having the layer structure of "base material/ionically crosslinked polycarboxylic acid polymer film" or "base material 1/ionically crosslinked polycarboxylic acid polymer film/base material 2" by a laminating method, coating method or the like. By this additional step, a multi-layer film of 3 layers, 4 layers or still more layers can be obtained.

As a still further additional step, may be mentioned a step of laminating at least one surface of the gas barrier film having the layer structure of the single layer of the ionically crosslinked polycarboxylic acid polymer film, "base material/ionically crosslinked polycarboxylic acid polymer film" or "base material 1/ionically crosslinked polycarboxylic acid polymer film/base material 2" and any given molded product on each other. By this step, a molded product having excellent gas barrier properties can be obtained.

No particular limitation is imposed on the base material. However, paper and plastic films (including sheets) are preferably used. The base material is generally used in the form of a film or sheet. However, the base material may be a molded product having a three-dimensional form, such as a plastic container if desired. As other base materials, may be mentioned glass sheets or plates, metal sheets or plates and aluminum foils. The base material used for applying the aqueous polymerizable monomer composition functions as a support for the coating film.

No particular limitation is imposed on the kind of a plastic forming the plastic film as the base material, and as examples thereof, may be mentioned olefin polymers such as high density polyethylene, medium density polyethylene, low density polyethylene, linear low density polyethylene, polypropylene, poly(4-methylpentene) and cyclic polyolefins, and acid-modified products thereof; vinyl acetate polymers such as polyvinyl acetate, ethylene-vinyl acetate copolymers, saponified products of ethylene-vinyl acetate copolymers and polyvinyl alcohol, and modified products thereof; polyesters such as polyethylene terephthalate, polybutylene terephthalate and polyethylene naphthalate; aliphatic polyesters such as poly(ϵ-caprolactone) polyhydroxybutyrate and polyhydroxyvalerate; polyamides such as nylon 6, nylon 66, nylon 12, nylon 6/66 copolymers, nylon 6/12 copolymers and meta-xyleneadipamide.nylon 6 copolymers; polyethers such as polyethylene glycol, poly(ether sulfone), poly(phenylene sulfide) and poly(phenylene oxide); halogenated polymers such as polyvinyl chloride, polyvinylidene chloride, polyvinyl fluoride and polyvinylidene fluoride; acrylic polymers such as polymethyl acrylate, polyethyl acrylate, polymethyl methacrylate, polyethyl methacrylate and polyacrylonitrile; polyimide resins; and besides resins for paints, such as alkyd resins, melamine resins, acrylic resins, pyroxylin, urethane resins, unsaturated polyester resins, phenol resins, amino resins, fluorocarbon resins and epoxy resins; and natural polymeric compounds such as cellulose, starch, pullulan, chitin, chitosan, glucomannan, agarose and gelatin.

The base material is preferably an unstretched film or stretched film formed of any one of these plastics. The plastic film may be subjected to a pretreatment by etching, corona discharge, plasma treatment, exposure to electron beam or the like, or pre-coated with an adhesive as needed. As the base material, may also be used that obtained by forming a thin film of an inorganic compound such as silicon oxide, aluminum oxide, aluminum or silicon nitride; a metal compound; or the like on the surface of a plastic film by a vapor deposition method, sputtering method or ion plating method. The surface of the plastic film used as the base material may also be subjected to printing. The plastic film may be a multi-layer film composed of a plurality of plastic films or a laminated film with another material such as paper. Further, the plastic film may be an oxygen-absorbing resin composition film having an oxygen-absorbing function or an oxygen-absorbing multi-layer film composed of this film and another plastic film.

In order to apply the aqueous polymerizable monomer composition on to one or both surfaces of the base material, any of a spraying method, a dipping method, a coating method using a coater and a printing method by a printing machine may be used. When the composition is applied by means of a coater or printing machine, various systems such as a gravure coater of a direct gravure system, reverse gravure system, kiss reverse gravure system, offset gravure system or the like; a reverse-roll coater, a micro-gravure coater, an air-knife coater, a dip coater, a bar coater, a comma coater, and a die coater may be adopted.

In the present invention, after the aqueous polymerizable monomer composition is applied on to the base material to form a coating film, the coating film, whose wet state has been retained substantially without drying water in the coating film, is subjected to a treatment by exposure to an ionizing radiation or heating or both of them to polymerize the α,β-unsaturated carboxylic acid monomer. When other polymerizable monomers such as a polyfunctional monomer are added, these polymerizable monomers are also polymerized.

As described above, the α,β-unsaturated carboxylic acid monomer is polymerized by the treatment by exposure to an ionizing radiation and/or heating on the coating film in the wet state, which has been formed from the aqueous polymerizable monomer composition, to form a polycarboxylic acid polymer. At the same time, the polycarboxylic acid polymer formed is ionically crosslinked with the polyvalent metal ion. The ionically crosslinked polycarboxylic acid polymer forms a cured coating film. Since the cured coating film is a polycarboxylic acid polymer film ionically crosslinked with the polyvalent metal ion, the film retains its film form even in a state containing water and shows good oxygen gas barrier property. When the solid content concentration in the aqueous polymerizable monomer composition used is low, the oxygen gas barrier property can be further enhanced by removing water in the cured coating film. When water remains in the cured coating film, water can be removed by subjecting the cured coating film to a heat treatment to volatilize off water or transmitting water through a moisture-permeable base material to volatilize off water.

The thickness of the coating film in the wet state is desirably controlled in such a manner that the thickness of the ionically crosslinked polycarboxylic acid polymer film formed falls within a range of generally 0.001 μm to 1 mm, preferably 0.01 to 100 μm, more preferably 0.1 to 10 μm. The coating weight of the aqueous polymerizable monomer composition varies according to the content of water or the solid content concentration. However, the coating weight is preferably 0.01 to 1,000 g/m$^2$, more preferably 0.1 to 100 g/m$^2$, still more preferably 1 to 80 g/m$^2$.

The ionizing radiation is preferably ultraviolet light, electron beam (beta radiation), gamma radiation or alpha radiation, with ultraviolet light or electron radiation being more preferred. The exposure to the ionizing radiation uses a device emitting its corresponding radiation source. For exposure to the electron beam, accelerated electron beam taken from an electron beam accelerator of 20 to 2,000 kV is generally used. The exposure dose of the accelerated electron beam is generally 1 to 300 kGy, preferably 5 to 200 kGy. The depth of the electron beam penetrated into the object of exposure varies according to an accelerating voltage. The electron beam more deeply penetrates as the accelerating voltage is higher. The use of the electron beam improves the adhesion between the base material such as a plastic film and the cured coating film by the grafting reaction of the α,β-unsaturated carboxylic acid monomer with the base material.

Upon the exposure to the ultraviolet light, a UV exposure unit such as a bactericidal lamp, ultraviolet fluorescent lamp, carbon arc, xenon lamp, low pressure mercury lamp, medium pressure mercury lamp, high pressure mercury lamp, extra-high pressure mercury lamp, metal halide lamp or electrodeless lamp is used to apply light including a wavelength range of 200 to 400 nm. The lamp input of the UV exposure unit indicates a wattage (W/cm) per 1 cm of an emission length. The intensity of the ultraviolet light emitted becomes higher as the wattage per unit length increases. The lamp input is generally selected from a range of 30 to 300 W/cm. The emission length is generally selected from a range of 40 to 2,500 mm.

In order to heat the coating film in the wet state to form the cured coating film, the coating film in the wet state is heated to a temperature of generally 50 to 250° C., preferably 60 to 220° C., more preferably 70 to 200° C. Heating means include a method of heating the coating film by means of a heater and a method of causing the coating film to pass through a temperature-controlled heating oven. The heating is conducted for generally 1 to 120 minutes, preferably 3 to 60 minutes, more preferably 5 to 30 minutes. It is preferable from the viewpoint of the gas barrier properties of the resulting cured coating film that the heating time be made longer as the heating temperature is lower, or the heating time be made shorter as the heating temperature is higher.

When there is need of removing the polymerization-inhibiting effect by oxygen upon the formation of the cured coating film, the treatment by the exposure to the ionizing radiation and/or the heating is preferably conducted under an inert gas atmosphere such as nitrogen gas, carbon dioxide gas or rare gas. In order to retain the wet state of the coating film and at the same time remove the polymerization-inhibiting effect by oxygen, the surface of the coating film in the wet state, which has been formed on the base material (support) is preferably covered with another base material (covering material). Examples of another base material used as the covering material include light-transmitting plastic films, glass plates, paper and aluminum foils. However, the covering materials are not limited thereto.

When the cured coating film is formed by the heating, the base material (hereinafter referred to as "base material 1") used as the support and the base material (hereinafter referred to as "base material 2") used as the covering material may not be necessarily ionizing radiation-transmitting bases. When the base material 1 used as the support is an ionizing radiation-transmitting base, and the exposure to the ionizing radiation such as ultraviolet light is conducted from the back side (back surface of the base material 1) of the coating film, an ionizing radiation-transmitting base may not be necessarily used as the base material 2 used as the covering material. When ultraviolet light is used as the ionizing radiation, a light-transmitting base material, for example, a light-transmitting plastic film or glass plate is preferably used as the ionizing radiation-transmitting base material.

Accordingly, in Step 2, the coating film in the wet state, which has been formed on the base material 1 (support), is preferably subjected to the treatment by the exposure to the ionizing radiation or heating or both of them while retaining the wet state of the coating film by covering the coating film in the wet state with another base material 2 (covering material). The materials of the base material 1 and base material 2 may be the same or different from each other. When the exposure to the ionizing radiation such as ultraviolet light is conducted, at least one of the base material 1 and base material 2 is preferably an ionizing radiation-transmitting base material (for example, a light-transmitting plastic film), and an ionizing radiation-transmitting base material is more preferably used as the base material 2 for covering the surface of the coating film.

The light-transmitting plastic film may be suitably selected from among the above-described plastic films usable as the support, such as polyolefin films, polyester films and polyamide films. Here, the light-transmitting property means a nature that an ionizing radiation such as ultraviolet light can be transmitted irrespective of the degree of light transmittance. Any plastic film may be generally used as the light-transmitting plastic film so far as the film is a visually transparent or translucent plastic film. When the electron beam is used as the ionizing radiation, it is only necessary to use an ionizing radiation-transmitting base material that transmits the accelerated electron beam, and the kind of the base material is not limited to the transparent or translucent base materials such as light-transmitting plastic films.

In the production process according to the present invention, the process is preferably continuously conducted by forming a coating film of the aqueous polymerizable monomer composition on the base material (support) such as a plastic film or paper, immediately covering the surface of the coating film with another base material (covering material) and conveying the base material to an ionizing radiation exposure unit and/or a heating device in a state that the wet state of the coating film has been retained. The conveying speed may be suitably set in view of a treatment efficiency that an ionically crosslinked polycarboxylic acid polymer film formed by the exposure to the ionizing radiation and/or the heat treatment can exhibit sufficient oxygen gas barrier property.

In the production process according to the present invention, after the cured coating film is formed by the exposure to the ionizing radiation such as ultraviolet light, a heat treatment (additional heat treatment) may be additionally conducted. Even when the cured coating film is formed by the heating, the additional heat treatment may also be conducted. Since the cured coating film is a polycarboxylic acid polymer film ionically crosslinked with the polyvalent metal ion, the cured coating film retains its film form even in a state containing water and shows good oxygen gas barrier property. However, when the content of water is too high, water in the cured coating film is removed, whereby the oxygen gas barrier property can be more improved. Water in the cured coating film volatilizes off through the base material 1 (support) and/or the base material 2 (covering material). When the heat treatment is conducted, whereby the removal efficiency and removal speed of water can be enhanced. The heat treatment may also be conducted after the base material 1 and/or the base material 2 is separated.

The additional heat treatment may not be necessarily conducted. If conducted, the cured coating film is heated at temperature of generally 50 to 250° C., preferably 60 to 220° C., more preferably 70 to 200° C. The treatment time varies according to the heating temperature and other treating conditions. When the treatment is continuously conducted, however, the treatment time is generally from 1 second to 60 minutes, preferably from 5 seconds to 30 minutes, more preferably from 10 seconds to 20 minutes. This heat treatment may be conducted in a dry heat atmosphere by conveying a multi-layer structure having a layer structure of "base material (support)/coating film in the wet state/base material (covering material)" into a heating oven. However, the heat treatment may also be conducted by bringing the multi-layer structure into contact with a heated roll. When any one of the base materials is a glass plate or aluminum foil, the heat treatment may be conducted after this base material is separated.

When a batch-wise heat treatment is conducted, not the continuous heat treatment, the treatment may be conducted by leaving the multi-layer structure having the layer structure of "base material (support)/coating film in the wet state/base material (covering material)" to stand within a heating oven controlled to a relatively low temperature (for example, a temperature of 30 to 180° C.) without winding the multi-layer structure on a roll. The suspending time is not particularly limited and may be suitably set according to the heat treatment temperature. However, the treatment time is preferably within a range of generally from 30 minutes to 24 hours from the viewpoint of production efficiency.

The removal of water may also be conducted by leaving the multi-layer structure to stand for a long period of time under ordinary temperature and ordinary humidity without conducting the heat treatment. Water may also be removed by leaving a container (a bag, tray, tube or the like) formed from a single-layer or multi-layer gas barrier film to stand in the air.

The ionically crosslinked polycarboxylic acid polymer film according to the present invention is excellent in oxygen gas barrier property. In other words, the ionically crosslinked polycarboxylic acid polymer film according to the present invention has an oxygen transmission rate of generally at most $50\times10^{-4}$ $cm^3$(STP)/($m^2$·s·MPa), preferably at most $30\times10^{-4}$ $cm^3$(STP)/($m^2$·s·MPa), more preferably at most $20\times10^{-4}$ $cm^3$(STP)/($m^2$·s·MPa), particularly preferably at most $10\times10^{-4}$ $cm^3$(STP)/($m^2$·s·MPa) as measured under conditions of a temperature of 30° C. and a high relative humidity of 80%. In many cases, this oxygen transmission rate can be reduced to at most $5\times10^{-4}$ $cm^3$(STP)/($m^2$·s·MPa), further at most $3\times10^{-4}$ $cm^3$(STP)/($m^2$·s·MPa). The lower limit value of the oxygen transmission rate of the ionically crosslinked polycarboxylic acid polymer film according to the present invention is generally $1\times10^{-6}$ $cm^3$(STP)/($m^2$·s·MPa), often $1\times10^{-5}$ $cm^3$(STP)/($m^2$·s·MPa).

The ionically crosslinked polycarboxylic acid polymer film (cured coating film) according to the present invention can be used as a single-layer gas barrier film by separating the base material or the base material 1 (support) and the base material 2 (covering material). The ionically crosslinked polycarboxylic acid polymer film according to the present invention can also be used as a multi-layer gas barrier film integrated with the base material or the base material 1 and/or the base material 2. In addition, the single layer of the ionically crosslinked polycarboxylic acid polymer film according to the present invention or the multi-layer gas barrier film having the layer of the ionically crosslinked polycarboxylic acid polymer film can also be used by being integrated with another layer or molded product. Various method including a laminating method and a coating method may be adopted for the integration with another layer or molded product.

6. Production Process of Multi-Layer Gas Barrier Film:

The multi-layer gas barrier film having the layer structure of "base material/ionically crosslinked polycarboxylic acid polymer film" according to the present invention can be obtained by the production process including the above-described Steps 1 and 2. The multi-layer gas barrier film having the layer structure of "base material 1/ionically crosslinked polycarboxylic acid polymer film/base material 2" according to the present invention can be obtained by forming a coating film in a wet state on the base material 1 in Step 1 and then arranging an additional step of covering the surface of the coating film with another base material 2.

The production process of the multi-layer gas barrier film having the layer structure of "base material 1/ionically crosslinked polycarboxylic acid polymer film/base material 2" will hereinafter be described in more detail.

More specifically, the production process of the multi-layer gas barrier film according to the present invention is a production process including the following Steps I to III:

(1) Step I of applying the aqueous polymerizable monomer composition on to a base material 1 to form a coating film in a wet state;

(2) Step II of covering the surface of the coating film in the wet state with another base material 2; and (3) Step III of subjecting the coating film in the wet state to a treatment by exposure to an ionizing radiation or heating or both of them to polymerize the α,β-unsaturated carboxylic acid monomer and at the same time to ionically crosslink the polymer formed with the polyvalent metal ion, thereby forming an ionically crosslinked polycarboxylic acid polymer film having an oxygen transmission rate of at most $50\times10^{-4}$ $cm^3$(STP)/($m^2$·s·MPa) as measured under conditions of a temperature of 30° C. and a high relative humidity of 80% between Steps I to III or after Step III, an additional step may also be arranged. A multi-layer film having a layer structure of "base material 1/ionically crosslinked polycarboxylic acid polymer film/base material 2" can be obtained by this additional step. By this production process, the multi-layer gas barrier film having the layer structure of "base material 1/ionically crosslinked polycarboxylic acid polymer film/base material 2" can be produced.

Paper or plastic films may be used as the base material 1 (support) and the base material 2 (covering material). The paper or plastic film may be of a single-layer or multi-layer. A composite material of paper and a plastic film may also be used. The plastic film may be subjected to a pretreatment by etching, corona discharge, plasma treatment, exposure to electron beam or the like, or pre-coated with an adhesive as needed. The base materials 1 and 2 may also be plastic films on which a thin film of an inorganic material or metal has been formed. In the multi-layer film according to the present invention, another plastic film, paper, metal foil or the like may be laminated on the surface(s) of the base material 1 and/or the base material 2 by a laminating method or coating method. In addition, a vapor deposition film of an inorganic material such as silicon oxide may be formed on the multi-layer film according to the present invention by a vapor deposition method.

The multi-layer structure permits the ionically crosslinked polycarboxylic acid polymer film to be provided as a gas barrier packaging material having various functions, for example, heat resistance, flexing resistance, abrasion resistance, light-screening property, heat sealability and oil resistance, in addition to the protection of the ionically crosslinked polycarboxylic acid polymer film. Even when the multi-layer gas barrier film is applied to other uses than the packaging material, multi-layer structures suitable for the respective uses may be formed. For example, a polyolefin film is used as the base material 1 or the base material 2, whereby a multi-layer film having heat sealability can be obtained. A polyester film or polyamide film is used as the base material 1 or the base material 2, whereby a multi-layer film excellent in heat resistance, abrasion resistance and the like can be obtained. An aluminum-deposited film or aluminum foil-laminated film is used as the base material 1 or the base material 2, whereby light-screening property can be imparted, or the gas barrier properties can be more improved. The surface(s) of the base material 1 and/or the base material 2 may also be subjected to printing. Further, an oxygen-absorbing film is used as the base material 1 and/or the base material 2, whereby the oxygen gas barrier property can be more improved.

Since the aqueous polymerizable monomer composition containing the α,β-unsaturated carboxylic acid monomer is used to form the coating film in the wet state, and the coating film in the wet state is exposed to the ionizing radiation or heated, thereby polymerizing the α,β-unsaturated carboxylic acid monomer to form the cured coating film in the production process according to the present invention, a multi-layer film excellent in the adhesion between the formed ionically crosslinked polycarboxylic acid polymer film and the base materials 1 and 2 can be provided. As described above, a hydrogen-abstracting initiator is used as the photo-polymerization initiator, whereby the adhesion to the base materials can be further improved. When electron beam is used as the ionizing radiation, the adhesion of the cured coating film (ionically crosslinked polycarboxylic acid polymer film) can be improved by the grafting reaction of the α,β-unsaturated carboxylic acid monomer with the base material 1 and/or the base material 2.

The gas barrier film according to the present invention is a multi-layer film having the layer structure of at least "base material 1/ionically crosslinked polycarboxylic acid polymer film/base material 2". Any one or both of the base materials 1 and 2 are preferably plastic films. The thickness of each layer may be suitably set as necessary for the end application intended. The thickness (dry thickness) of the ionically crosslinked polycarboxylic acid polymer film is preferably controlled so as to fall within a range of generally 0.001 μm to 1 mm, preferably 0.01 to 100 μm, more preferably 0.1 to 10 μm from the viewpoint of gas barrier properties.

In the production process according to the present invention, it is preferable that at least one of the base material 1 and the base material 2 be a plastic film, and a process, in which the coating film in the wet state is subjected to the exposure treatment to the ionizing radiation through the base material 1 and/or the base material 2 in Step III, be adopted. As the plastic film, may be used an ordinary light-transmitting transparent or translucent plastic film. It is particularly preferable to adopt a process, in which the surface of the coating film in the wet state, which has been formed on the base material 1, is covered with the light-transmitting plastic film base material 2 in Step II, and the coating film in the wet state is subjected to the exposure treatment to ultraviolet light or electron beam through the plastic film base material 2. The materials of the base material 1 and base material 2 may be the same or different from each other. After Step III, Step IV of subjecting the cured coating film to a heat treatment may be additionally arranged if desired. The conditions for the heat treatment are the same as described above.

7. Use:

The single-layer and multi-layer gas barrier films according to the present invention can be used as gas barrier packaging materials or packaging material for heat sterilization. The gas barrier films according to the present invention are suitable for use as packaging materials for foods, drinks, drugs, medicines, electronic parts, precision metal parts, etc. that tend to undergo deterioration by oxygen. The gas barrier films according to the present invention may also be used as vacuum thermal insulation materials.

Specific examples of the forms of packages formed with the gas barrier films according to the present invention include a flat pouch, a standing pouch, a pouch with a nozzle, a pillow type bag, a gusset bag and a shell type packaging bag. By selecting the layer structure (kinds of the base materials) of the multi-layer gas barrier films, ease of unsealing, ease of tearing, shrinkability, suitability for microwave oven, ultraviolet-screening ability, oxygen-absorbing ability, designing ability, etc. can be imparted to the packages.

Specific examples of the forms of packaging containers formed with the gas barrier films according to the present invention include bottles, trays, caps and tubes. The gas barrier films according to the present invention may also be used for lid materials for packaging containers, top sealing materials and the like. By selecting the layer structure of the multi-layer gas barrier films, ease of unsealing, ease of tearing, shrinkability, suitability for microwave oven, ultraviolet-screening ability, oxygen-absorbing ability, designing ability, etc. can also be imparted to these packaging containers, lid materials and the like. As methods for forming and processing into packaging bags and packaging containers, may be adopted various methods adopted in this technical field, such as a thermally fusion-bonding method.

EXAMPLES

The present invention will hereinafter be described more specifically by the following Examples and Comparative Example.

1. Oxygen Transmission Rate

In the present invention, an oxygen transmission rate was measured in accordance with the following measuring method.

An oxygen transmission rate of a film was measured under conditions of a temperature of 30° C. and a relative humidity of 80% by means of an oxygen transmission tester, OXTRAN (trademark) 2/20 manufactured by Modern Control Co. The measuring method was carried out in accordance with ASTM D 3985-81 (corresponding to the B method prescribed in JIS K 7126). The unit of the measured value is $cm^3$(STP)/($m^2$·s·MPa). "STP" means standard conditions (0° C., 1 atm) for defining the volume of oxygen.

The measurement of an oxygen transmission rate of a multi-layer film was conducted in a state of the multi-layer film. Since the oxygen transmission rate of a film or paper used as the base material is sufficiently high, however, the measured value can be evaluated as substantially coinciding with the oxygen transmission rate of the ionically crosslinked polycarboxylic acid polymer film.

2. Base Material

In the following Examples and Comparative Examples, plastic films used as base materials are as follows.

(1) PET #12: Polyethylene terephthalate film, LUMIRROR (Trademark) P60, product of Toray Industries, Inc., thickness: 12 μm;
(2) ONy #15: Biaxially stretched nylon 6 film, EMBLEM (trademark) ONBC, product of UNITIKA CO., LTD., thickness: 15 μm, product corona-treated on the inner surface;
(3) OPP #20: Biaxially stretched polypropylene film, TORAYFAN (trademark) BO, product of Toray Industries, Inc., thickness: 20 μm, product corona-treated on one surface;
(4) PE #30: Unstretched polyethylene film (LLDPE film), T.U.X (trademark)-HC, product of TOHCELLO CO., LTD., thickness: 30 μm;

(5) CPP #60: Unstretched polypropylene film, TORAYFAN (trademark) NO ZK93K, product of TORAY Plastic Film Co., Ltd., thickness: 60 μm, product corona-treated on the inner surface.

Example 1

Composition No. 1

In distilled water were dissolved 3.00 g of acrylic acid (product of Wako Pure Chemical Industries, Ltd.) and 1.16 g of zinc oxide (product of Wako Pure Chemical Industries, Ltd.), and 0.04 g of benzophenone (product of Wako Pure Chemical Industries, Ltd.) was added to the resultant solution to obtain an aqueous polymerizable monomer composition No. 1. A polyvalent metal ion in this composition No. 1 was a divalent zinc ion, the content thereof was 0.93 g, and the chemical equivalent of the zinc ion to the carboxyl group of acrylic acid was 0.69. The solid content concentration in the composition No. 1 was 56% by weight, and the content of water was 44% by weight. The composition of the composition No. 1 is shown in Table 1.

Industries, Ltd.), cinnamic acid (product of Wako Pure Chemical Industries, Ltd.), senecioic acid (product of Aldrich), tiglic acid (product of Wako Pure Chemical Industries, Ltd.), sorbic acid (product of Wako Pure Chemical Industries, Ltd.), itaconic acid (product of Wako Pure Chemical Industries, Ltd.), maleic acid (product of Wako Pure Chemical Industries, Ltd.) and citraconic acid (product of Wako Pure Chemical Industries, Ltd.). The compositions are shown in Table 1.

Examples 10 and 11

Composition Nos. 10 and 11

Acrylic acid (product of Wako Pure Chemical Industries, Ltd.) and zinc diacrylate (product of Aldrich) were dissolved in distilled water, and benzophenone (product of Wako Pure Chemical Industries, Ltd.) was added to the resultant solutions to obtain aqueous polymerizable monomer composition Nos. 10 and 11. The compositions are shown in Table 1.

TABLE 1

| | Unsaturated carboxylic acid | | Metal compound | | Initiator | | Water | Whole | Metal ion | | | Solid content | Comp. |
|---|---|---|---|---|---|---|---|---|---|---|---|---|---|
| | Kind | Amount (g) | Kind | Amount (g) | Kind | Amount (g) | Amount (g) | amount (g) | Kind | Amount (g) | Chemical equivalent | conc. (wt. %) | code No. |
| Ex. 1 | Acrylic acid | 3.00 | ZnO | 1.16 | Benzophenone | 0.04 | 2.84 | 7.04 | $Zn^{+2}$ | 0.93 | 0.69 | 56 | No. 1 |
| Ex. 2 | Methacrylic acid | 3.00 | ZnO | 0.62 | Benzophenone | 0.04 | 3.34 | 7.00 | $Zn^{+2}$ | 0.50 | 0.44 | 50 | No. 2 |
| Ex. 3 | Cinnamic acid | 3.00 | ZnO | 0.56 | Benzophenone | 0.04 | 4.40 | 8.00 | $Zn^{+2}$ | 0.45 | 0.68 | 43 | No. 3 |
| Ex. 4 | Senecioic acid | 3.00 | ZnO | 0.52 | Benzophenone | 0.04 | 3.44 | 7.00 | $Zn^{+2}$ | 0.42 | 0.43 | 49 | No. 4 |
| Ex. 5 | Tiglic acid | 3.00 | ZnO | 0.47 | Benzophenone | 0.04 | 5.49 | 9.00 | $Zn^{+2}$ | 0.38 | 0.39 | 38 | No. 5 |
| Ex. 6 | Sorbic acid | 3.00 | ZnO | 0.36 | Benzophenone | 0.04 | 5.80 | 9.20 | $Zn^{+2}$ | 0.29 | 0.33 | 36 | No. 6 |
| Ex. 7 | Acrylic acid, itaconic acid | 3.00 0.20 | ZnO | 0.49 | Benzophenone | 0.04 | 4.07 | 7.80 | $Zn^{+2}$ | 0.39 | 0.27 | 46 | No. 7 |
| Ex. 8 | Acrylic acid, maleic acid | 3.00 0.20 | ZnO | 0.51 | Benzophenone | 0.04 | 7.25 | 11.00 | $Zn^{+2}$ | 0.41 | 0.28 | 33 | No. 8 |
| Ex. 9 | Acrylic acid, citraconic acid | 3.00 0.20 | ZnO | 0.50 | Benzophenone | 0.04 | 8.26 | 12.00 | $Zn^{+2}$ | 0.40 | 0.28 | 30 | No. 9 |
| Ex. 10 | Acrylic acid | 0.78 | Zinc diacrylate | 3.17 | Benzophenone | 0.04 | 3.11 | 7.10 | $Zn^{+2}$ | 1.00 | 0.74 | 56 | No. 10 |
| Ex. 11 | Acrylic acid | 0.62 | Zinc diacrylate | 3.43 | Benzophenone | 0.04 | 2.41 | 6.50 | $Zn^{+2}$ | 1.08 | 0.79 | 62 | No. 11 |

Examples 2 to 9

Composition Nos. 2 to 9

Aqueous polymerizable monomer composition Nos. 2 to 9 were obtained in the same manner as in Example 1 except that their corresponding α,β-unsaturated carboxylic acid monomers shown in Table 1 were used in place of 3.00 g of acrylic acid, and the contents of the respective components were changed as shown in Table 1. The kinds and sources of the α,β-unsaturated carboxylic acid monomers used are as follows: acrylic acid (product of Wako Pure Chemical Industries, Ltd.), methacrylic acid (product of Wako Pure Chemical Examples 12 to 18

Composition Nos. 12 to 18

Acrylic acid (product of Wako Pure Chemical Industries, Ltd.) and their corresponding metal compounds shown in Table 2 were dissolved in distilled water, and benzophenone (product of Wako Pure Chemical Industries, Ltd.) was added to the resultant solutions to obtain aqueous polymerizable monomer composition Nos. 12 to 18. The kinds and sources of the respective metal compounds are as follows: calcium diacrylate (product of Nihon Joryu Kogyo K.K.), copper diacrylate (product of Nihon Joryu Kogyo K.K.), magnesium diacrylate (product of Nihon Joryu Kogyo K.K.), aluminum acrylate (product of Nihon Joryu Kogyo K.K., Al-AAP-3; solution containing 17% by weight of an acrylic acid component and 8% by weight of an aluminum oxide component), iron(III) oxide (product of Wako Pure Chemical Industries, Ltd.) and zinc diacrylate (product of Aldrich). The compositions are shown in Table 2.

Comparative Example 1

Composition No. 51

Acrylic acid (product of Wako Pure Chemical Industries, Ltd.) was dissolved in distilled water to obtain an aqueous polymerizable monomer composition No. 51. The composition is shown in Table 3.

TABLE 2

| | Unsaturated carboxylic acid | | Metal compound | | Initiator | | Water | Whole | Metal ion | | | Solid content | Comp. |
|---|---|---|---|---|---|---|---|---|---|---|---|---|---|
| | Kind | Amount (g) | Kind | Amount (g) | Kind | Amount (g) | Amount (g) | amount (g) | Kind | Amount (g) | Chemical equivalent | conc. (wt. %) | code No. |
| Ex. 12 | Acrylic acid | 0.55 | Calcium diacrylate | 0.95 | Benzo-phenone | 0.02 | 5.48 | 7.00 | $Ca^{+2}$ | 0.21 | 0.58 | 21 | No. 12 |
| Ex. 13 | Acrylic acid | 1.03 | Copper diacrylate | 0.39 | Benzo-phenone | 0.04 | 5.44 | 6.90 | $Cu^{+2}$ | 0.12 | 0.21 | 20 | No. 13 |
| Ex. 14 | Acrylic acid | 0.42 | Magnesium diacrylate | 1.37 | Benzo-phenone | 0.04 | 4.98 | 6.80 | $Mg^{+2}$ | 0.20 | 0.74 | 26 | No. 14 |
| Ex. 15 | Acrylic acid | 2.05 | Al-AAP-3 | 5.00 | Benzo-phenone | 0.01 | 2.94 | 10.00 | $Al^{+3}$ | 0.20 | 0.55 | 31 | No. 15 |
| Ex. 16 | Acrylic acid | 2.80 | Iron(III) oxide | 0.59 | Benzo-phenone | 0.01 | 5.60 | 9.00 | $Fe^{+3}$ | 0.41 | 0.57 | 35 | No. 16 |
| Ex. 17 | Acrylic acid | 0.63 | Zinc diacrylate, calcium diacrylate | 2.88<br>0.46 | Benzo-phenone | 0.02 | 3.00 | 6.99 | $Zn^{+2}$<br>$Ca^{+2}$ | 0.90<br>0.10 | 0.78 | 57 | No. 17 |
| Ex. 18 | Acrylic acid, | 0.48 | Zinc diacrylate, magnesium diacrylate | 2.85<br>0.62 | Benzo-phenone | 0.05 | 3.02 | 7.02 | $Zn^{+2}$<br>$Mg^{+2}$ | 0.90<br>0.09 | 0.84 | 57 | No. 18 |

Example 19

Composition No. 19

Acrylic acid (product of Wako Pure Chemical Industries, Ltd.), calcium diacrylate (product of Nihon Joryu Kogyo K.K.) and copper diacrylate (product of Nihon Joryu Kogyo K.K.) were dissolved in distilled water, and benzophenone (product of Wako Pure Chemical Industries, Ltd.) was added to the resultant solution to obtain an aqueous polymerizable monomer composition No. 19. The composition is shown in Table 3.

Example 20

Composition No. 20

Acrylic acid (product of Wako Pure Chemical Industries, Ltd.) and zinc oxide (product of Wako Pure Chemical Industries, Ltd.) were dissolved in distilled water to obtain an aqueous polymerizable monomer composition No. 20. The composition is shown in Table 3.

Example 21

Composition No. 21

Acrylic acid (product of Wako Pure Chemical Industries, Ltd.) and calcium diacrylate (product of Nihon Joryu Kogyo K.K.) were dissolved in distilled water to obtain an aqueous polymerizable monomer composition No. 21. The composition is shown in Table 3.

Comparative Example 2

Composition No. 52

Zinc oxide (product of Wako Pure Chemical Industries, Ltd.) was dissolved in distilled water to obtain a composition No. 52. The composition is shown in Table 3.

Comparative Example 3

Composition No. 53

Zinc diacrylate (product of Aldrich) was dissolved in distilled water, and benzophenone (product of Wako Pure Chemical Industries, Ltd.) was added to the resultant solution to obtain a composition No. 53. The composition is shown in Table 3.

Comparative Example 4

Composition No. 54

Acrylic acid (product of Wako Pure Chemical Industries, Ltd.) and zinc oxide (product of Wako Pure Chemical Industries, Ltd.) were dissolved in distilled water, and benzophenone (product of Wako Pure Chemical Industries, Ltd.) was added to the resultant solution to obtain an aqueous polymerizable monomer composition No. 54. In this composition No. 54, the equivalent of the zinc ion to the carboxyl group is as low as 0.05 (degree of neutralization: 5%). The composition is shown in Table 3.

Comparative Example 5

Composition No. 55

Acrylic acid (product of Wako Pure Chemical Industries, Ltd.) and zinc oxide (product of Wako Pure Chemical Industries, Ltd.) were dissolved in distilled water, and benzophenone (product of Wako Pure Chemical Industries, Ltd.) was added to the resultant solution to obtain an aqueous polymerizable monomer composition No. 55. In this composition No. 55, the solid content concentration is as low as 10% by weight (water content: 90% by weight). The composition is shown in Table 3.

Comparative Example 6

Composition No. 56

Acrylic acid (product of Wako Pure Chemical Industries, Ltd.) and zinc oxide (product of Wako Pure Chemical Industries, Ltd.) were dissolved in distilled water, and benzophenone (product of Wako Pure Chemical Industries, Ltd.) was added to the resultant solution to obtain an aqueous polymerizable monomer composition No. 56. In this composition No. 56, the solid content concentration is as high as 85% by weight (water content: 15% by weight). The compositions are shown in Table 3.

unit (COMPACT UV CONVEYOR CSOT-40, manufactured by Japan Storage Battery Co., Ltd.).

After the exposure, the multi-layer structure was heat-treated under conditions of 120° C. and 5 minutes in a Geer oven to obtain a multi-layer film having, as an intermediate layer, a polycarboxylic acid polymer film (gas barrier film) ionically crosslinked with a zinc ion. The oxygen transmission rate of the multi-layer film was measured. The layer structure, UV exposure conditions, heat treatment conditions and oxygen transmission rate are shown in Table 4.

In the following Examples and Comparative Examples, the same table coater as described above was used to conduct the application, and the same UV exposure unit as described above was used if exposed to ultraviolet light unless expressly noted.

Examples 23 to 27

Multi-layer films having a gas barrier film as an intermediate layer were produced in the same manner as in Example 22 except that respective coating liquids having the same compositions as the aqueous polymerizable monomer compositions Nos. 2 to 6 were used in place of the coating liquid having the same composition as the aqueous polymerizable monomer composition No. 1, and evaluation was made in the same manner as described above. The layer structures, UV exposure conditions, heat treatment conditions and oxygen transmission rates are shown in Table 4.

TABLE 3

| | Unsaturated carboxylic acid | | Metal compound | | Initiator | | Water | Whole | Metal ion | | | Solid content | Comp. |
|---|---|---|---|---|---|---|---|---|---|---|---|---|---|
| | Kind | Amount (g) | Kind | Amount (g) | Kind | Amount (g) | Amount (g) | amount (g) | Kind | Amount (g) | Chemical equivalent | conc. (wt. %) | code No. |
| Ex. 19 | Acrylic acid | 0.60 | Calcium diacrylate, copper diacrylate | 0.83 0.07 | Benzo-phenone | 0.02 | 5.49 | 7.01 | $Ca^{+2}$ $Cu^{+2}$ | 0.18 0.02 | 0.53 | 21 | No. 19 |
| Ex. 20 | Acrylic acid | 3.00 | ZnO | 1.24 | — | — | 2.86 | 7.10 | $Zn^{+2}$ | 1.00 | 0.74 | 56 | No. 20 |
| Ex. 21 | Acrylic acid | 1.14 | Calcium diacrylate | 0.97 | — | — | 2.99 | 5.10 | $Ca^{+2}$ | 0.21 | 0.40 | 41 | No. 21 |
| Comp. Ex. 1 | Acrylic acid | 3.00 | — | — | — | — | 3.00 | 6.00 | — | — | — | 50 | No. 51 |
| Comp. Ex. 2 | — | — | ZnO | 1.24 | — | — | 4.96 | 6.20 | $Zn^{+2}$ | 1.00 | — | 20 | No. 52 |
| Comp. Ex. 3 | — | — | Zinc diacrylate | 4.00 | Benzo-phenone | 0.04 | 2.96 | 7.00 | $Zn^{+2}$ | 0.87 | 1.00 | 57 | No. 53 |
| Comp. Ex. 4 | Acrylic acid, | 3.00 | ZnO | 0.09 | Benzo-phenone | 0.04 | 3.87 | 7.00 | $Zn^{+2}$ | 0.07 | 0.05 | 44 | No. 54 |
| Comp. Ex. 5 | Acrylic acid | 3.00 | ZnO | 1.17 | Benzo-phenone | 0.04 | 33.79 | 38.00 | $Zn^{+2}$ | 0.94 | 0.69 | 10 | No. 55 |
| Comp. Ex. 6 | Acrylic acid | 3.00 | ZnO | 1.16 | Benzo-phenone | 0.04 | 0.49 | 4.69 | $Zn^{+2}$ | 0.93 | 0.69 | 85 | No. 56 |

Example 22

A coating liquid having the same composition as the aqueous polymerizable monomer composition No. 1 prepared above was applied on to a polyethylene terephthalate film (PET #12) by a bar, the coating weight in a wet state of which was 12 g/m$^2$, using a table coater (manufactured by RK Print-Coat Instruments Co., K303PROOFER). After the application, the surface of the coating film was immediately covered with a biaxially stretched nylon 6 film (ONy #15) to obtain a multi-layer structure having a layer structure of "base material (PET)/coating film in the wet state/base material (ONy)". The multi-layer structure was then exposed to ultraviolet light (UV light) from above the base material (ONy) under conditions of a lamp output of 120 W/cm, a conveying speed of 5 m/min and a lamp height of 24 cm by means of a UV exposure unit (continued)

Example 28

A coating liquid having the same composition as the aqueous polymerizable monomer composition No. 7 prepared above was applied on to a polyethylene terephthalate film (PET #12) by a bar, the coating weight in a wet state of which was 24 g/m$^2$, using the table coater, and the surface of the coating film was immediately covered with a biaxially stretched polypropylene film (OPP #20) to obtain a multi-layer structure having a layer structure of "base material (PET)/coating film in the wet state/base material (OPP)".

The multi-layer structure was exposed to UV light from above the base material (OPP) under conditions of a lamp output of 160 W/cm, a conveying speed of 10 m/min and a lamp height of 24 cm by means of the UV exposure unit (COMPACT UV CONVEYOR CSOT-40, manufactured by Japan Storage Battery Co., Ltd.). The multi-layer structure was then heat-treated under conditions of 80° C. and 10 minutes in a Geer oven to obtain a multi-layer film having a gas barrier film as an intermediate layer. The oxygen transmission rate of the multi-layer film was measured. The layer structure, UV exposure conditions, heat treatment conditions and oxygen transmission rate are shown in Table 4.

Examples 29 and 30

Multi-layer films having a gas barrier film as an intermediate layer were produced in the same manner as in Example 28 except that respective coating liquids having the same compositions as the aqueous polymerizable monomer compositions Nos. 8 and 9 were used in place of the coating liquid having the same composition as the aqueous polymerizable monomer composition No. 7, and evaluation was made in the same manner as described above. The layer structures, UV exposure conditions, heat treatment conditions and oxygen transmission rates are shown in Table 4.

TABLE 4

| | Layer structure | | | | | | | | |
|---|---|---|---|---|---|---|---|---|---|
| | Base material 1 (support) | Coating liquid Composition code | Coating liquid Wet (g/m$^2$) | Base material 2 (Covering material) | UV exposure Lamp output (W/cm) | UV exposure Conveying speed (m/min) | Heat treatment Temperature (° C.) | Heat treatment Time (min) | Oxygen transmission rate 30° C./80% RH [cm$^3$ (STP)/m$^2$ · s · MPa] |
| Ex. 22 | PET #12 | No. 1 | 12 | ONy #15 | 120 | 5 | 120 | 5 | 1 × 10$^{-4}$ |
| Ex. 23 | PET #12 | No. 2 | 12 | ONy #15 | 120 | 5 | 120 | 5 | 10 × 10$^{-4}$ |
| Ex. 24 | PET #12 | No. 3 | 12 | ONy #15 | 120 | 5 | 120 | 5 | 14 × 10$^{-4}$ |
| Ex. 25 | PET #12 | No. 4 | 12 | ONy #15 | 120 | 5 | 120 | 5 | 15 × 10$^{-4}$ |
| Ex. 26 | PET #12 | No. 5 | 12 | ONy #15 | 120 | 5 | 120 | 5 | 15 × 10$^{-4}$ |
| Ex. 27 | PET #12 | No. 6 | 12 | ONy #15 | 120 | 5 | 120 | 5 | 15 × 10$^{-4}$ |
| Ex. 28 | PET #12 | No. 7 | 24 | OPP # 20 | 160 | 10 | 80 | 10 | 4 × 10$^{-4}$ |
| Ex. 29 | PET #12 | No. 8 | 24 | OPP # 20 | 160 | 10 | 80 | 10 | 5 × 10$^{-4}$ |
| Ex. 30 | PET #12 | No. 9 | 24 | OPP # 20 | 160 | 10 | 80 | 10 | 5 × 10$^{-4}$ |

Example 31

A coating liquid having the same composition as the aqueous polymerizable monomer composition No. 10 prepared above was applied on to a biaxially stretched nylon 6 film (ONy #15) by a bar, the coating weight in a wet state of which was 12 g/m$^2$, using the table coater, and the surface of the coating film was immediately covered with an unstretched polyethylene film (PE #30) to obtain a multi-layer structure having a layer structure of "base material (ONy)/coating film in the wet state/base material (PE)".

The multi-layer structure was exposed to UV light from above the base material (PE) under conditions of a lamp output of 80 W/cm, a conveying speed of 2 m/min and a lamp height of 24 cm by means of the UV exposure unit. The multi-layer structure was then heat-treated under conditions of 70° C. and 15 minutes in a Geer oven to obtain a multi-layer film having a gas barrier film as an intermediate layer. The layer structure, UV exposure conditions, heat treatment conditions and oxygen transmission rate are shown in Table 5.

Examples 32 to 37

Multi-layer films having a gas barrier film as an intermediate layer were produced in the same manner as in Example 31 except that respective coating liquids having the same compositions as the aqueous polymerizable monomer compositions Nos. 11 to 16 were used in place of the coating liquid having the same composition as the aqueous polymerizable monomer composition No. 10, and evaluation was made in the same manner as described above. The layer structures, UV exposure conditions, heat treatment conditions and oxygen transmission rates are shown in Table 5.

Example 38

A coating liquid having the same composition as the aqueous polymerizable monomer composition No. 17 was applied on to a polyethylene terephthalate film (PET #12) by a bar, the coating weight in a wet state of which was 6 g/m$^2$, using the table coater, and the surface of the coating film was immediately covered with an unstretched polypropylene film (CPP #60) to obtain a multi-layer structure having a layer structure of "base material (PET)/coating film in the wet state/base material (CPP)". The multi-layer structure was exposed to UV light from above the base material (CPP) under conditions of a lamp output of 120 W/cm, a conveying speed of 10 m/min and a lamp height of 24 cm by means of the UV exposure unit, and then heat-treated under conditions of 110° C. and 3 minutes in a Geer oven to obtain a multi-layer film having a gas barrier film as an intermediate layer. The layer structure, UV exposure conditions, heat treatment conditions and oxygen transmission rate are shown in Table 5.

Examples 39 and 40

Multi-layer films having a gas barrier film as an intermediate layer were produced in the same manner as in Example 38 except that respective coating liquids having the same compositions as the aqueous polymerizable monomer compositions Nos. 18 and 19 were used in place of the coating liquid having the same composition as the aqueous polymerizable monomer composition No. 17, and evaluation was made in the same manner as described above. The layer structures, UV exposure conditions, heat treatment conditions and oxygen transmission rates are shown in Table 5.

Example 41

A coating liquid having the same composition as the aqueous polymerizable monomer composition No. 20 was applied on to a polyethylene terephthalate film (PET #12) by a bar, the coating weight in a wet state of which was 12 g/m$^2$, using the table coater, and the surface of the coating film was immediately covered with a biaxially stretched nylon 6 film (ONy #15) to obtain a multi-layer structure having a layer structure of "base material (PET)/coating film in the wet state/base material (ONy)". The multi-layer structure was exposed to UV light from above the base material (ONy) under conditions of a lamp output of 120 W/cm, a conveying speed of 10 m/min and a lamp height of 24 cm by means of the UV exposure unit, and then heat-treated under conditions of 110° C. and 3 minutes in a Geer oven to obtain a multi-layer film having a gas barrier film as an intermediate layer. The layer structure, UV exposure conditions, heat treatment conditions and oxygen transmission rate are shown in Table 5.

Example 42

A multi-layer film having a gas barrier film as an intermediate layer was produced in the same manner as in Example 41 except that a coating liquid having the same composition as the aqueous polymerizable monomer compositions No. 21 were used in place of the coating liquid having the same composition as the aqueous polymerizable monomer composition No. 20, and evaluation was made in the same manner as described above. The layer structure, UV exposure conditions, heat treatment conditions and oxygen transmission rate are shown in Table 5.

Examples 44 and 45

Multi-layer films having a gas barrier film as an intermediate layer were produced in the same manner as in Example 43 except that a biaxially stretched polypropylene film (OPP #20) and a biaxially stretched nylon 6 film (ONy #15) were respectively used as base materials (covering materials) for covering the surface of the coating film in place of the unstretched polyethylene film (PE #30). The layer structures, UV exposure conditions, heat treatment conditions and oxygen transmission rates are shown in Table 6.

Example 46

A multi-layer film having a gas barrier film as an intermediate layer was produced in the same manner as in Example 22 except that the conveying speed in Example 22 was changed from 5 m/min to 2 m/min, and the heat treatment after the UV exposure was not conducted. The layer structure, UV exposure conditions, heat treatment conditions and oxygen transmission rate are shown in Table 6.

Examples 47 and 48

Multi-layer films having a gas barrier film as an intermediate layer were produced without conducting the heat treatment after the UV exposure in the same manner as in Example 46 except that the base material (covering material) was changed from the biaxially stretched nylon 6 film (ONy #15) to an unstretched polypropylene film (CPP #60) and an unstretched polyethylene film (PE #30), respectively. The layer structures, UV exposure conditions, heat treatment conditions and oxygen transmission rates are shown in Table 6.

TABLE 5

| | Layer structure | | | | UV exposure | | Heat treatment | | Oxygen transmission rate |
|---|---|---|---|---|---|---|---|---|---|
| | Base material 1 (support) | Coating liquid Composition code | Wet (g/m$^2$) | Base material 2 (Covering material) | Lamp output (W/cm) | Conveying speed (m/min) | Temperature (° C.) | Time (min) | 30° C./80% RH [cm$^3$ (STP)/m$^2$ · s · MPa] |
| Ex. 31 | ONy #15 | No. 10 | 12 | PE #30 | 80 | 2 | 70 | 15 | 1 × 10$^{-4}$ |
| Ex. 32 | ONy #15 | No. 11 | 12 | PE #30 | 80 | 2 | 70 | 15 | 1 × 10$^{-4}$ |
| Ex. 33 | ONy #15 | No. 12 | 12 | PE #30 | 80 | 2 | 70 | 15 | 2 × 10$^{-4}$ |
| Ex. 34 | ONy #15 | No. 13 | 12 | PE #30 | 80 | 2 | 70 | 15 | 10 × 10$^{-4}$ |
| Ex. 35 | ONy #15 | No. 14 | 12 | PE #30 | 80 | 2 | 70 | 15 | 20 × 10$^{-4}$ |
| Ex. 36 | ONy #15 | No. 15 | 12 | PE #30 | 80 | 2 | 70 | 15 | 5 × 10$^{-4}$ |
| Ex. 37 | ONy #15 | No. 16 | 12 | PE #30 | 80 | 2 | 70 | 15 | 6 × 10$^{-4}$ |
| Ex. 38 | PET #12 | No. 17 | 6 | CPP # 60 | 120 | 10 | 110 | 3 | 2 × 10$^{-4}$ |
| Ex. 39 | PET #12 | No. 18 | 6 | CPP # 60 | 120 | 10 | 110 | 3 | 2 × 10$^{-4}$ |
| Ex. 40 | PET #12 | No. 19 | 6 | CPP # 60 | 120 | 10 | 110 | 3 | 5 × 10$^{-4}$ |
| Ex. 41 | PET #12 | No. 20 | 12 | ONy #15 | 120 | 10 | 110 | 3 | 1 × 10$^{-4}$ |
| Ex. 42 | PET #12 | No. 21 | 12 | ONy #15 | 120 | 10 | 110 | 3 | 2 × 10$^{-4}$ |

Example 43

A coating liquid having the same composition as the aqueous polymerizable monomer composition No. 1 prepared above was applied on to paper by a bar, the coating weight in a wet state of which was 12 g/m$^2$, using the table coater, and the surface of the coating film was immediately covered with an unstretched polyethylene film (PE #30) to obtain a multi-layer structure having a layer structure of "base material (paper)/coating film in the wet state/base material (PE)". The multi-layer structure was exposed to UV light from above the base material (PE) under conditions of a lamp output of 120 W/cm, a conveying speed of 10 m/min and a lamp height of 24 cm by means of the UV exposure unit, and then heat-treated under conditions of 90° C. and 1 minute in a Geer oven to obtain a multi-layer film having a gas barrier film as an intermediate layer. The layer structure, UV exposure conditions, heat treatment conditions and oxygen transmission rate are shown in Table 6.

Comparative Example 7

A multi-layer film was produced in the same manner as in Example 22 except that a coating liquid having the same composition as the aqueous polymerizable monomer composition No. 51 was used in place of the coating liquid having the same composition as the aqueous polymerizable monomer composition No. 1, and the UV exposure conditions and heat treatment conditions were changes as shown in Table 6. The layer structure, UV exposure conditions, heat treatment conditions and oxygen transmission rate are shown in Table 6. It is understood from the results shown in Table 6 that the polyacrylic acid film not ionically crosslinked is insufficient in oxygen gas barrier property. In other words, this polyacrylic acid film does not show sufficient oxygen gas barrier property under high-humidity conditions.

Comparative Example 8

A multi-layer film was produced in the same manner as in Example 22 except that a coating liquid having the same composition as the composition No. 52 was used in place of the coating liquid having the same composition as the aqueous polymerizable monomer composition No. 1, and the UV exposure conditions and heat treatment conditions were changes as shown in Table 6. The layer structure, UV exposure conditions, heat treatment conditions and oxygen transmission rate are shown in Table 6. It is understood from the results shown in Table 6 that the film containing no unsaturated carboxylic acid is insufficient in oxygen gas barrier property.

Comparative Example 9

A multi-layer film was produced in the same manner as in Example 22 except that the UV exposure was not conducted. The coating film remained in a solution state, and the oxygen gas barrier property of the resulting multi-layer film was poor.

Comparative Example 10

A multi-layer film was produced in the same manner as in Example 22 except that a coating liquid having the same composition as the aqueous polymerizable monomer composition No. 53 was used in place of the coating liquid having the same composition as the aqueous polymerizable monomer composition No. 1. The layer structure, UV exposure conditions, heat treatment conditions and oxygen transmission rate are shown in Table 6. The film formed by using the aqueous polymerizable monomer composition (coating liquid) containing zinc diacrylate, the carboxyl group of the unsaturated carboxylic acid of which was neutralized by 100% (chemical equivalent: 1.00), was whitened upon the UV exposure to precipitate powdery gel. The oxygen gas barrier property of this multi-layer film was poor.

Comparative Example 11

A multi-layer film was produced in the same manner as in Example 22 except that a coating liquid having the same composition as the aqueous polymerizable monomer composition No. 54 was used in place of the coating liquid having the same composition as the aqueous polymerizable monomer composition No. 1. The layer structure, UV exposure conditions, heat treatment conditions and oxygen transmission rate are shown in Table 6. It is understood from the results shown in Table 6 that the ionically crosslinked polycarboxylic acid polymer film insufficient in the ionic crosslinking is insufficient in oxygen gas barrier property.

Comparative Example 12

A multi-layer film was produced in the same manner as in Example 22 except that a coating liquid having the same composition as the aqueous polymerizable monomer composition No. 55 was used in place of the coating liquid having the same composition as the aqueous polymerizable monomer composition No. 1. The layer structure, UV exposure conditions, heat treatment conditions and oxygen transmission rate are shown in Table 6. The ionically crosslinked polycarboxylic acid polymer film formed by using the aqueous polymerizable monomer composition (coating liquid) low in the solid content concentration precipitated gel in its coating film, and so no uniform film was obtained. In addition, the oxygen gas barrier property of this multi-layer film was poor.

Comparative Example 13

A multi-layer film was produced in the same manner as in Example 22 except that a coating liquid having the same composition as the aqueous polymerizable monomer composition No. 56 was used in place of the coating liquid having the same composition as the aqueous polymerizable monomer composition No. 1. The layer structure, UV exposure conditions, heat treatment conditions and oxygen transmission rate are shown in Table 6. The aqueous polymerizable monomer composition (coating liquid) high in the solid content concentration was a slurry-like solution, and was difficult to be coated. The film formed by using this coating liquid was whitened upon the UV exposure to precipitate powdery gel. The oxygen gas barrier property of this multi-layer film was poor.

TABLE 6

| | Layer structure | | | | UV exposure | | Heat treatment | | Oxygen transmission rate |
|---|---|---|---|---|---|---|---|---|---|
| | Base | Coating liquid | | Base material 2 | | | | | |
| | material 1 (support) | Composition code | Wet (g/m²) | (Covering material) | Lamp output (W/cm) | Conveying speed (m/min) | Temperature (° C.) | Time (min) | 30° C./80% RH [cm³ (STP)/m² · s · MPa] |
| Ex. 43 | Paper | No. 1 | 12 | PE #30 | 120 | 10 | 90 | 1 | $2 \times 10^{-4}$ |
| Ex. 44 | Paper | No. 1 | 12 | OPP #20 | 120 | 10 | 90 | 1 | $2 \times 10^{-4}$ |
| Ex. 45 | Paper | No. 1 | 12 | ONy #15 | 120 | 10 | 90 | 1 | $2 \times 10^{-4}$ |
| Ex. 46 | PET #12 | No. 1 | 12 | ONy #15 | 120 | 2 | — | — | $2 \times 10^{-4}$ |
| Ex. 47 | PET #12 | No. 1 | 12 | CPP # 60 | 120 | 2 | — | — | $2 \times 10^{-4}$ |
| Ex. 48 | PET #12 | No. 1 | 12 | PE #30 | 120 | 2 | — | — | $2 \times 10^{-4}$ |
| Comp. Ex. 7 | PET #12 | No. 51 | 12 | ONy #15 | 120 | 10 | 120 | 5 | $1 \times 10^{-2}$ |
| Comp. Ex. 8 | PET #12 | No. 52 | 12 | ONy #15 | 120 | 10 | 120 | 5 | $1 \times 10^{-2}$ |
| Comp. Ex. 9 | PET #12 | No. 1 | 12 | ONy #15 | — | — | 120 | 5 | $1 \times 10^{-2}$ |
| Comp. Ex. 10 | PET #12 | No. 53 | 12 | ONy #15 | 120 | 5 | 120 | 5 | $1 \times 10^{-2}$ |

TABLE 6-continued

| | Layer structure | | | | UV exposure | | Heat treatment | | Oxygen transmission rate |
|---|---|---|---|---|---|---|---|---|---|
| | Base | Coating liquid | | Base material 2 | | | | | |
| | material 1 (support) | Composition code | Wet ($g/m^2$) | (Covering material) | Lamp output (W/cm) | Conveying speed (m/min) | Temperature (° C.) | Time (min) | 30° C./80% RH [$cm^3$ (STP)/$m^2 \cdot s \cdot MPa$] |
| Comp. Ex. 11 | PET #12 | No. 54 | 12 | ONy #15 | 120 | 5 | 120 | 5 | $1 \times 10^{-2}$ |
| Comp. Ex. 12 | PET #12 | No. 55 | 12 | ONy #15 | 120 | 5 | 120 | 5 | $1 \times 10^{-2}$ |
| Comp. Ex. 13 | PET #12 | No. 56 | 12 | ONy #15 | 120 | 5 | 120 | 5 | $1 \times 10^{-2}$ |

Examples 49 to 58

Composition Nos. 22 to 31

Various unsaturated carboxylic acids and metal compounds were dissolved in distilled water as shown in Table 7 to obtain aqueous polymerizable monomer compositions Nos. 22 to 31. The sources of the respective components are the same as described above. The compositions are shown in Table 7.

TABLE 7

| | Unsaturated carboxylic acid | | Metal compound | | Initiator | | Water | Whole | Metal ion | | | Solid content | Comp. |
|---|---|---|---|---|---|---|---|---|---|---|---|---|---|
| | Kind | Amount (g) | Kind | Amount (g) | Kind | Amount (g) | Amount (g) | amount (g) | Kind | Amount (g) | Chemical equivalent | conc. (wt. %) | code No. |
| Ex. 49 | Acrylic acid | 3.00 | ZnO | 1.24 | — | — | 3.40 | 7.64 | $Zn^{+2}$ | 1.00 | 0.74 | 52 | No. 22 |
| Ex. 50 | Methacrylic acid | 3.00 | ZnO | 0.57 | — | — | 3.93 | 7.50 | $Zn^{+2}$ | 0.46 | 0.41 | 46 | No. 23 |
| Ex. 51 | Senecioic acid | 3.00 | ZnO | 0.49 | — | — | 3.51 | 7.00 | $Zn^{+2}$ | 0.39 | 0.40 | 48 | No. 24 |
| Ex. 52 | Tiglic acid | 3.00 | ZnO | 0.50 | — | — | 5.50 | 9.00 | $Zn^{+2}$ | 0.40 | 0.41 | 38 | No. 25 |
| Ex. 53 | Acrylic acid, maleic acid | 3.00<br>0.20 | ZnO | 1.02 | — | — | 6.78 | 11.00 | $Zn^{+2}$ | 0.82 | 0.56 | 37 | No. 26 |
| Ex. 54 | Acrylic acid | 0.95 | Zinc diacrylate | 2.92 | — | — | 3.23 | 7.10 | $Zn^{+2}$ | 0.92 | 0.68 | 54 | No. 27 |
| Ex. 55 | Acrylic acid | 0.55 | Calcium diacrylate | 0.95 | — | — | 5.50 | 7.00 | $Ca^{+2}$ | 0.21 | 0.58 | 21 | No. 28 |
| Ex. 56 | Acrylic acid | 0.36 | Magnesium diacrylate | 1.44 | — | — | 5.01 | 6.80 | $Mg^{+2}$ | 0.21 | 0.78 | 26 | No. 29 |
| Ex. 57 | Acrylic acid | 2.05 | Al-AAP-3 | 5.00 | — | — | 2.94 | 10.00 | $Al^{+3}$ | 0.20 | 0.55 | 31 | No. 30 |
| Ex. 58 | Acrylic acid | 0.48 | Zinc diacrylate, magnesium diacrylate | 2.85<br>0.62 | — | — | 3.04 | 7.00 | $Zn^{+2}$<br>$Mg^{+2}$ | 0.90<br>0.09 | 0.84 | 57 | No. 31 |

(Note)
(1) Al-AAP-3: Aluminum acrylate, product of Nihon Joryu Kogyo K.K., solution containing 17% by weight of an acrylic acid component and 8% by weight of an aluminum oxide component.

Example 59

A coating liquid having the same composition as the aqueous polymerizable monomer composition No. 22 prepared above was applied on to a polyethylene terephthalate film (PET #12) by a bar, the coating weight in a wet state of which was 12 $g/m^2$, using the table coater. After the application, the surface of the coating film was immediately covered with the same polyethylene terephthalate film as that used above to obtain a multi-layer structure having a layer structure of "base material (PET)/coating film in the wet state/base material (PET)". The multi-layer structure was then exposed to electron beam (EB) from above the base material (PET) under conditions of an accelerating voltage of 100 kV, a conveying speed of 10 m/min and an exposure dose of 50 kGy by means of an EB exposure unit (CB250/15/180L, EB unit manufactured by Iwasaki Electric Co., Ltd.) of a tray carrying conveyer system.

After the exposure, the multi-layer structure was heat-treated under conditions of 180° C. and 15 minutes in a Geer oven to obtain a multi-layer film having, as an intermediate layer, a polycarboxylic acid polymer film (gas barrier film) ionically crosslinked with a zinc ion. The oxygen transmission rate of the multi-layer film was measured. The layer structure, EB exposure conditions, heat treatment conditions and oxygen transmission rate are shown in Table 8.

In the following Examples and Comparative Examples, the same EB exposure unit as described above was used if exposed to the electron beam.

Examples 60 to 69

Multi-layer films having, as an intermediate layer, an ionically crosslinked polycarboxylic acid polymer film were produced in the same manner as in Example 59 except that respective coating liquids having the same compositions as the aqueous polymerizable monomer compositions Nos. 23 to 31 were used in place of the coating liquid having the same composition as the aqueous polymerizable monomer composition No. 22, and the kinds of the base material 1 and/or the base material 2, coating weight, accelerating voltage and exposure dose upon EB exposure, and heat treatment conditions were changed as shown in Table 8, and evaluation was made in the same manner as described above. The layer structures, EB exposure conditions, heat treatment conditions and oxygen transmission rates are shown in Table 8.

Comparative Examples 14 to 19

Multi-layer films having, as an intermediate layer, an ionically crosslinked polycarboxylic acid polymer film were produced in the same manner as in Example 60 except that respective coating liquids having the same compositions as the aqueous polymerizable monomer compositions Nos. 51 to 56 were used in place of the coating liquid having the same composition as the aqueous polymerizable monomer composition No. 23, and evaluation was made in the same manner as described above. The layer structures, EB exposure conditions, heat treatment conditions and oxygen transmission rates are shown in Table 8.

zinc diacrylate, the carboxyl group of the unsaturated carboxylic acid of which was neutralized by 100%, was whitened upon the EB exposure to precipitate powdery gel. The oxygen gas barrier property of this multi-layer film was poor.

The ionically crosslinked polycarboxylic acid polymer film (Comparative Example 17) insufficient in the ionic crosslinking is insufficient in oxygen gas barrier property.

The ionically crosslinked polycarboxylic acid polymer film (Comparative Example 18) formed by using the aqueous polymerizable monomer composition low in the solid content concentration precipitated gel in its coating film, and so no uniform film was obtained. The oxygen gas barrier property of this multi-layer film was poor.

The aqueous polymerizable monomer composition No. 56 high in the solid content concentration was a slurry-like solution, and was difficult to be coated. The film (Comparative Example 19) formed by using this coating liquid was whitened upon the EB exposure to precipitate powdery gel. The oxygen gas barrier property of this multi-layer film was poor.

TABLE 8

| | Layer structure | | | | EB exposure | | | Heat treatment | | Oxygen transmission rate |
|---|---|---|---|---|---|---|---|---|---|---|
| | Base material 1 (support) | Coating liquid Composition code | Coating liquid Wet (g/m²) | Base material 2 (Covering material) | Accelerating voltage (kV) | Conveying speed (m/min) | Exposure dose (kGy) | Temp. (° C.) | Time (min) | 30° C./80% RH [cm³ (STP)/m² · s · MPa] |
| Ex. 59 | PET #12 | No. 22 | 12 | PET #12 | 100 | 10 | 50 | 180 | 15 | $9 \times 10^{-4}$ |
| Ex. 60 | PET #12 | No. 23 | 12 | ONy #15 | 100 | 10 | 50 | 120 | 5 | $30 \times 10^{-4}$ |
| Ex. 61 | PET #12 | No. 24 | 24 | OPP #20 | 100 | 10 | 50 | 80 | 10 | $35 \times 10^{-4}$ |
| Ex. 62 | ONy #15 | No. 25 | 12 | PE #30 | 150 | 10 | 100 | 70 | 15 | $32 \times 10^{-4}$ |
| Ex. 63 | ONy #15 | No. 26 | 12 | PE #30 | 150 | 10 | 100 | 70 | 15 | $15 \times 10^{-4}$ |
| Ex. 64 | OPP #20 | No. 27 | 12 | CPP # 60 | 150 | 10 | 100 | 80 | 3 | $5 \times 10^{-4}$ |
| Ex. 65 | OPP #20 | No. 28 | 12 | CPP # 60 | 150 | 10 | 100 | 80 | 3 | $12 \times 10^{-4}$ |
| Ex. 66 | OPP #20 | No. 29 | 12 | CPP # 60 | 150 | 10 | 100 | 80 | 3 | $34 \times 10^{-4}$ |
| Ex. 67 | PET #12 | No. 30 | 12 | ONy #15 | 70 | 10 | 20 | 120 | 3 | $33 \times 10^{-4}$ |
| Ex. 68 | PET #12 | No. 31 | 6 | ONy #15 | 70 | 10 | 20 | 120 | 3 | $10 \times 10^{-4}$ |
| Ex. 69 | PET #12 | No. 27 | 12 | ONy #15 | 100 | 10 | 20 | — | — | $20 \times 10^{-4}$ |
| Comp. Ex. 14 | PET #12 | No. 51 | 12 | ONy #15 | 100 | 10 | 50 | 120 | 5 | $1 \times 10^{-2}$ |
| Comp. Ex. 15 | PET #12 | No. 52 | 12 | ONy #15 | 100 | 10 | 50 | 120 | 5 | $1 \times 10^{-2}$ |
| Comp. Ex. 16 | PET #12 | No. 53 | 12 | ONy #15 | 100 | 10 | 50 | 120 | 5 | $1 \times 10^{-2}$ |
| Comp. Ex. 17 | PET #12 | No. 54 | 12 | ONy #15 | 100 | 10 | 50 | 120 | 5 | $1 \times 10^{-2}$ |
| Comp. Ex. 18 | PET #12 | No. 55 | 12 | ONy #15 | 100 | 10 | 50 | 120 | 5 | $1 \times 10^{-2}$ |
| Comp. Ex. 19 | PET #12 | No. 56 | 12 | ONy #15 | 100 | 10 | 50 | 120 | 5 | $1 \times 10^{-2}$ |

As apparent from the results shown in Table 8, the multi-layer films according to the present invention each including the ionically crosslinked polycarboxylic acid polymer film obtained by the EB exposure are excellent in oxygen gas barrier property.

On the other hand, the polyacrylic acid film (Comparative Example 14) not ionically crosslinked and the film (Comparative Example 15) containing no unsaturated carboxylic acid are insufficient in oxygen gas barrier property.

The film (Comparative Example 16) formed by using the aqueous polymerizable monomer composition containing

Examples 70 to 78

Composition Nos. 32 to 40

Various unsaturated carboxylic acids and metal compounds were dissolved in distilled water as shown in Table 9 to obtain aqueous polymerizable monomer compositions Nos. 32 to 40. The sources of the respective components are the same as described above. The compositions are shown in Table 9.

Comparative Examples 20 to 25

Composition Nos. 57 to 62

Various unsaturated carboxylic acids, metal compounds, diacrylic metal salts, the carboxyl group of the unsaturated carboxylic acid of which was neutralized by 100%, or mixtures thereof were dissolved in distilled water as shown in Table 9 to obtain aqueous polymerizable monomer compositions Nos. 57 to 62. The sources of the respective components are the same as described above. The compositions are shown in Table 9.

acid polymer film (gas barrier film) ionically crosslinked with a magnesium ion. The oxygen transmission rate of the multi-layer film was measured. The layer structure, UV exposure conditions, heat treatment conditions and oxygen transmission rate are shown in Table 10.

In the following Examples and Comparative Examples, the same UV exposure unit as described above was used unless expressly noted.

Examples 80 and 81

Multi-layer films were produced in the same manner as in Example 79 except that respective coating liquids having the same compositions as the aqueous polymerizable monomer compositions Nos. 33 and 34 were used in place of the coating liquid having the same composition as the aqueous polymerizable monomer composition No. 32, and evaluation was made in the same manner as described above. The layer structures, UV exposure conditions, heat treatment conditions and oxygen transmission rates are shown in Table 10.

TABLE 9

| | Unsaturated carboxylic acid | | Metal compound | | Initiator | | Water | Whole | Metal ion | | | Solid content | Comp. |
|---|---|---|---|---|---|---|---|---|---|---|---|---|---|
| | Kind | Amount (g) | Kind | Amount (g) | Kind | Amount (g) | Amount (g) | amount (g) | Kind | Amount (g) | Chemical equivalent | conc. (wt. %) | code No. |
| Ex. 70 | Acrylic acid | 0.80 | Magnesium diacrylate | 3.10 | Benzo-phenone | 0.04 | 4.50 | 8.44 | $Mg^{+2}$ | 0.45 | 0.77 | 47 | No. 32 |
| Ex. 71 | Acrylic acid | 0.55 | Calcium diacrylate | 0.95 | Benzo-phenone | 0.01 | 5.48 | 6.99 | $Ca^{+2}$ | 0.21 | 0.58 | 22 | No. 33 |
| Ex. 72 | Acrylic acid | 3.10 | Copper diacrylate | 1.50 | Benzo-phenone | 0.01 | 9.20 | 13.81 | $Cu^{+2}$ | 0.46 | 0.25 | 33 | No. 34 |
| Ex. 73 | Acrylic acid | 1.40 | Zinc diacrylate | 2.80 | Benzo-phenone | 0.02 | 5.00 | 9.22 | $Zn^{+2}$ | 0.93 | 0.61 | 46 | No. 35 |
| Ex. 74 | Acrylic acid | 2.50 | ZnO | 1.00 | Benzo-phenone | 0.02 | 2.00 | 5.52 | $Zn^{+2}$ | 0.80 | 0.71 | 64 | No. 36 |
| Ex. 75 | Meth-acrylic acid | 5.43 | Iron(III) oxide | 0.96 | Benzo-phenone | 0.02 | 8.65 | 15.06 | $Fe^{+3}$ | 0.67 | 0.57 | 43 | No. 37 |
| Ex. 76 | Acrylic acid | 2.05 | Al-AAP-3 | 5.00 | Benzo-phenone | 0.01 | 2.94 | 10.00 | $Al^{+3}$ | 0.20 | 0.55 | 31 | No. 38 |
| Ex. 77 | Itaconic acid | 0.15 | Zinc diacrylate | 2.88 | — | — | 6.00 | 9.03 | $Zn^{+2}$ | 0.91 | 0.92 | 34 | No. 39 |
| Ex. 78 | Maleic acid | 0.20 | Calcium diacrylate | 2.10 | — | — | 7.20 | 9.50 | $Ca^{+2}$ | 0.46 | 0.87 | 24 | No. 40 |
| Comp. Ex. 20 | Maleic acid | 3.00 | — | — | — | — | 3.00 | 6.00 | — | — | 0 | 50 | No. 57 |
| Comp. Ex. 21 | — | — | MgO | 1.24 | — | — | 3.76 | 5.00 | $Mg^{+2}$ | 0.75 | ∞ | 25 | No. 58 |
| Comp. Ex. 22 | — | — | Magnesium diacrylate | 4.00 | — | — | 2.96 | 6.96 | $Mg^{+2}$ | 0.58 | 1.00 | 57 | No. 59 |
| Comp. Ex. 23 | Acrylic acid | 3.00 | Calcium diacrylate | 0.06 | — | — | 3.87 | 6.93 | $Ca^{+2}$ | 0.01 | 0.01 | 44 | No. 60 |
| Comp. Ex. 24 | Acrylic acid | 3.00 | Copper diacrylate | 1.17 | — | — | 33.79 | 37.96 | $Cu^{+2}$ | 0.36 | 0.27 | 11 | No. 61 |
| Comp. Ex. 25 | Acrylic acid | 3.00 | ZnO | 1.23 | — | — | 0.49 | 4.72 | $Zn^{+2}$ | 0.99 | 0.73 | 84 | No. 62 |

(Note)
(1) Al-AAP-3: Aluminum acrylate, product of Nihon Joryu Kogyo K.K., solution containing 17% by weight of an acrylic acid component and 8% by weight of an aluminum oxide component.

Example 79

A coating liquid having the same composition as the aqueous polymerizable monomer composition No. 32 prepared above was applied on to a polyethylene terephthalate film (PET #12) by a bar, the coating weight in a wet state of which was 6 g/m$^2$, using the table coater to obtain a multi-layer structure having a layer structure of “base material (PET)/coating film in the wet state”. After the application, the multi-layer structure was immediately exposed to ultraviolet light from above the coating film in the wet state under conditions of a lamp output of 120 W/cm, a conveying speed of 5 m/min and a lamp height of 24 cm by means of a UV exposure unit (COMPACT UV CONVEYOR CSOT-40 GS, manufactured by YUASA).

After the exposure, the multi-layer structure was heat-treated under conditions of 120° C. and 5 minutes in a Geer oven to obtain a multi-layer film including a polycarboxylic Example 82

A coating liquid having the same composition as the aqueous polymerizable monomer composition No. 35 was used and applied on to a biaxially stretched nylon 6 film (ONy #15) by a bar, the coating weight in a wet state of which was 24 g/m$^2$, and the coating film was exposed to ultraviolet light under conditions of a lamp output of 160 W/cm, a conveying speed of 5 m/min and a lamp height of 24 cm. After the exposure, no heat treatment was conducted. The layer structure, UV exposure conditions and oxygen transmission rate are shown in Table 10.

Example 83

A coating liquid having the same composition as the aqueous polymerizable monomer composition No. 36 was used and applied on to a glass plate by a bar, the coating weight in a wet state of which was 24 g/$m^2$. After the application, the surface of the coating film was immediately covered with a biaxially stretched nylon 6 film (ONy #15) to obtain a multi-layer structure having a layer structure of "glass plate/coating film in the wet state/base material (ONy)". The multi-layer structure was then exposed to ultraviolet light from above the base material (ONy) under conditions of a lamp output of 160 W/cm, a conveying speed of 5 m/min and a lamp height of 24 cm. After the exposure, the glass plate was separated. No heat treatment was conducted. The oxygen transmission rate of the multi-layer film was measured. The layer structure, UV exposure conditions and oxygen transmission rate are shown in Table 10.

Example 84

A multi-layer film was obtained under the same conditions as in Example 83 except that a coating liquid having the same composition as the aqueous polymerizable monomer composition No. 37 was used in place of the coating liquid having the same composition as the aqueous polymerizable monomer composition No. 36, and an aluminum foil was used in place of the glass plate, and the multi-layer film was evaluated as to the oxygen transmission rate thereof. The layer structure, UV exposure conditions and oxygen transmission rate are shown in Table 10.

Examples 85

A coating liquid having the same composition as the aqueous polymerizable monomer composition No. 38 was used and applied on to an unstretched polyethylene film (PE #30) by a bar, the coating weight in a wet state of which was 12 g/m to obtain a multi-layer structure having a layer structure of "base material (PE)/coating film in the wet state". After the application, the multi-layer structure was immediately exposed to ultraviolet light from above the coating film in the wet state under conditions of a lamp output of 120 W/cm, a conveying speed of 2 m/min and a lamp height of 24 cm.

After the exposure, the multi-layer structure was heat-treated under conditions of 80° C. and 1 minute in a Geer oven to obtain a multi-layer film. The oxygen transmission rate of the multi-layer film was measured. The layer structure, UV exposure conditions, heat treatment conditions and oxygen transmission rate are shown in Table 10.

Examples 86 and 87

Multi-layer films were produced in the same manner as in Example 85 except that respective coating liquids having the same compositions as the aqueous polymerizable monomer compositions Nos. 39 and 40 were used in place of the coating liquid having the same composition as the aqueous polymerizable monomer composition No, 38, and an unstretched polypropylene film (CPP #60) and a biaxially stretched polypropylene film (OPP #20) were respectively used as the base material in place of the unstretched polyethylene film, and evaluation was made in the same manner as described above. The layer structures, UV exposure conditions, heat treatment conditions and oxygen transmission rates are shown in Table 10.

Comparative Examples 26 to 31

Films were produced in the same manner as in Example 79 except that respective coating liquids having the same compositions as the aqueous polymerizable monomer compositions Nos. 57 to 62 were used in place of the coating liquid having the same composition as the aqueous polymerizable monomer composition No. 32. The layer structures, UV exposure conditions, heat treatment conditions and oxygen transmission rates are shown in Table 10.

TABLE 10

| | Layer structure | | | | UV exposure | | Heat treatment | | Oxygen transmission rate |
|---|---|---|---|---|---|---|---|---|---|
| | Base material 1 (support) | Coating liquid: Composition code | Coating liquid: Wet (g/$m^2$) | Base material 2 (Covering material) | Lamp output (W/cm) | Conveying speed (m/min) | Temperature (° C.) | Time (min) | 30° C./80% RH [$cm^3$ (STP)/$m^2$ · s · MPa] |
| Ex. 79 | PET #12 | No. 32 | 6 | — | 120 | 5 | 120 | 5 | $18 \times 10^{-4}$ |
| Ex. 80 | PET #12 | No. 33 | 6 | — | 120 | 5 | 120 | 5 | $4 \times 10^{-4}$ |
| Ex. 81 | PET #12 | No. 34 | 6 | — | 120 | 5 | 120 | 5 | $22 \times 10^{-4}$ |
| Ex. 82 | ONy #15 | No. 35 | 24 | — | 160 | 5 | — | — | $8 \times 10^{-4}$ |
| Ex. 83 | Glass plate | No. 36 | 24 | ONy #15 | 160 | 5 | — | — | $5 \times 10^{-4}$ |
| Ex. 84 | Aluminum foil | No. 37 | 24 | ONy #15 | 160 | 5 | — | — | $20 \times 10^{-4}$ |
| Ex. 85 | PE #30 | No. 38 | 12 | — | 120 | 2 | 80 | 1 | $25 \times 10^{-4}$ |
| Ex. 86 | CPP #60 | No. 39 | 12 | — | 120 | 2 | 80 | 1 | $11 \times 10^{-4}$ |
| Ex. 87 | OPP #20 | No. 40 | 12 | — | 120 | 2 | 80 | 1 | $14 \times 10^{-4}$ |
| Comp. Ex. 26 | PET #12 | No. 57 | 6 | — | 120 | 5 | 120 | 5 | $1 \times 10^{-2}$ |
| Comp. Ex. 27 | PET #12 | No. 58 | 6 | — | 120 | 5 | 120 | 5 | $1 \times 10^{-2}$ |
| Comp. Ex. 28 | PET #12 | No. 59 | 6 | — | 120 | 5 | 120 | 5 | $1 \times 10^{-2}$ |
| Comp. Ex. 29 | PET #12 | No. 60 | 6 | — | 120 | 5 | 120 | 5 | $1 \times 10^{-2}$ |

TABLE 10-continued

| | Layer structure | | | | UV exposure | | Heat treatment | | Oxygen transmission rate |
|---|---|---|---|---|---|---|---|---|---|
| | Base | Coating liquid | | Base material 2 | | | | | |
| | material 1 (support) | Composition code | Wet (g/m$^2$) | (Covering material) | Lamp output (W/cm) | Conveying speed (m/min) | Temperature (° C.) | Time (min) | 30° C./80% RH [cm$^3$ (STP)/m$^2$ · s · MPa] |
| Comp. Ex. 30 | PET #12 | No. 61 | 6 | — | 120 | 5 | 120 | 5 | $1 \times 10^{-2}$ |
| Comp. Ex. 31 | PET #12 | No. 62 | 6 | — | 120 | 5 | 120 | 5 | $1 \times 10^{-2}$ |

(Note)
(1) In Example 83, the oxygen transmission rate was measured after the glass plate was separated after the UV exposure.
(2) In Example 84, the oxygen transmission rate was measured after the aluminum foil was separated after the UV exposure.

As apparent from the results shown in Table 10, the multi-layer films according to the present invention each including the ionically crosslinked polycarboxylic acid polymer film obtained by the UV exposure are excellent in oxygen gas barrier property.

On the other hand, it is understood that the polymaleic acid film (Comparative Example 26) not ionically crosslinked and the film (Comparative Example 27) containing no unsaturated carboxylic acid are insufficient in oxygen gas barrier property.

Examples 88 to 94

Composition Nos. 41 to 47

Various unsaturated carboxylic acids and metal compounds were dissolved in distilled water as shown in Table 11 to obtain aqueous polymerizable monomer compositions Nos. 41 to 47. The sources of the respective components are the same as described above. The compositions are shown in Table 11.

TABLE 11

| | Unsaturated carboxylic acid | | Metal compound | | Initiator | | Water | Whole | Metal ion | | | Solid content | Comp. |
|---|---|---|---|---|---|---|---|---|---|---|---|---|---|
| | Kind | Amount (g) | Kind | Amount (g) | Kind | Amount (g) | Amount (g) | amount (g) | Kind | Amount (g) | Chemical equivalent | conc. (wt. %) | code No. |
| Ex. 88 | Acrylic acid | 0.80 | Magnesium diacrylate | 3.10 | — | — | 4.50 | 8.40 | $Mg^{+2}$ | 0.45 | 0.77 | 46 | No. 41 |
| Ex. 89 | Acrylic acid | 0.55 | Calcium diacrylate | 0.95 | — | — | 5.48 | 6.98 | $Ca^{+2}$ | 0.21 | 0.58 | 21 | No. 42 |
| Ex. 90 | Acrylic acid | 3.10 | Copper diacrylate | 1.50 | — | — | 9.20 | 13.80 | $Cu^{+2}$ | 0.46 | 0.25 | 33 | No. 43 |
| Ex. 91 | Acrylic acid | 1.40 | Zinc diacrylate | 2.80 | — | — | 5.00 | 9.20 | $Zn^{+2}$ | 0.93 | 0.61 | 46 | No. 44 |
| Ex. 92 | Acrylic acid, | 2.50 | ZnO | 1.00 | — | — | 2.00 | 5.50 | $Zn^{+2}$ | 0.80 | 0.71 | 64 | No. 45 |
| Ex. 93 | Methacrylic acid | 5.43 | Iron(III) oxide | 0.96 | — | — | 8.65 | 15.04 | $Fe^{+3}$ | 0.67 | 0.57 | 42 | No. 46 |
| Ex. 94 | Acrylic acid | 2.05 | Al-AAP-3 | 5.00 | — | — | 2.94 | 10.00 | $Al^{+3}$ | 0.20 | 0.55 | 31 | No. 47 |

The film (Comparative Example 28) containing the polyvalent metal ion in an amount more than the chemical equivalent of the unsaturated carboxylic acid was whitened upon the UV exposure to precipitate powdery gel. The oxygen gas barrier property of this multi-layer film was poor.

It is understood that the film (Comparative Example 29) insufficient in the ionic crosslinking is insufficient in oxygen gas barrier property.

It is understood that the film (Comparative Example 30) obtained by subjecting the coating liquid low in the solid content concentration to the UV exposure undergoes whitening in its coating film, and the oxygen gas barrier property thereof is insufficient.

The aqueous polymerizable monomer composition No. 62 high in the solid content concentration was a slurry-like solution, and was difficult to be coated. It is understood that the film (Comparative Example 31) formed by using this coating liquid is insufficient in oxygen gas barrier property.

Example 95

A coating liquid having the same composition as the aqueous polymerizable monomer composition No. 41 prepared above was applied on to a polyethylene terephthalate film (PET #12) by a bar, the coating weight in a wet state of which was 12 g/m$^2$, using the table coater to obtain a multi-layer structure having a layer structure of "base material (PET)/coating film in the wet state". After the application, the multi-layer structure was immediately exposed to electron beam from above the coating film under conditions of an accelerating voltage of 100 kV, a conveying speed of 10 m/min and an exposure dose of 50 kGy by means of the EB exposure unit.

After the exposure, the multi-layer structure was heat-treated under conditions of 180° C. and 15 minutes in a Geer oven to produce a multi-layer film having a polycarboxylic acid polymer film ionically crosslinked with a zinc ion, and the oxygen transmission rate thereof was measured. The layer structure, EB exposure conditions, heat treatment conditions and oxygen transmission rate are shown in Table 12.

Examples 96 and 97

Multi-layer films were produced in the same manner as in Example 95 except that respective coating liquids having the same compositions as the aqueous polymerizable monomer compositions Nos. 42 and 43 were used in place of the coating liquid having the same composition as the aqueous polymerizable monomer composition No. 41, and the coating weight and heat treatment conditions were changed as shown in Table 12, and the oxygen transmission rates thereof were measured. The layer structures, EB exposure conditions, heat treatment conditions and oxygen transmission rates are shown in Table 12.

Example 98

A coating liquid having the same composition as the aqueous polymerizable monomer composition No. 44 was used and applied on to a glass plate by a bar, the coating weight in a wet state of which was 12 g/m$^2$. After the application, the surface of the coating film was immediately covered with a biaxially stretched nylon 6 film (ONy #15) to obtain a multi-layer structure having a layer structure of "glass plate/coating film in the wet state/base material (ONy)". The multi-layer structure was then exposed to electron beam from above the glass plate under conditions of an accelerating voltage of 250 kV, a conveying speed of 10 m/min and an exposure dose of 100 kGy.

After the exposure, the multi-layer structure was heat-treated under conditions of 70° C. and 15 minutes in a Geer oven. Thereafter, the glass plate was separated, and the oxygen transmission rate of the multi-layer film was then measured. The layer structure, EB exposure conditions, heat treatment conditions and oxygen transmission rate are shown in Table 12.

Example 99

A multi-layer film was obtained under the same conditions as in Example 98 except that a coating liquid having the same composition as the aqueous polymerizable monomer composition No. 45 was used in place of the coating liquid having the same composition as the aqueous polymerizable monomer composition No. 44, and an aluminum foil was used in place of the glass plate, and the multi-layer film was evaluated as to the oxygen transmission rate thereof. The layer structure, EB exposure conditions, heat treatment conditions and oxygen transmission rate are shown in Table 12.

Example 100

A coating liquid having the same composition as the aqueous polymerizable monomer composition No. 46 prepared above was applied on to a biaxially polypropylene film (OPP #20) by a bar, the coating weight in a wet state of which was 6 g/m$^2$, using the table coater to obtain a multi-layer structure having a layer structure of "base material (OPP)/coating film in the wet state". After the application, the multi-layer structure was immediately exposed to electron beam under conditions of an accelerating voltage of 150 kV, a conveying speed of 10 m/min and an exposure dose of 100 kGy by means of the EB exposure unit to obtain a multi-layer film having a polycarboxylic acid polymer film ionically crosslinked. After the exposure, no heat treatment was conducted. The oxygen transmission rate of the multi-layer film was measured. The layer structure, EB exposure conditions and oxygen transmission rate are shown in Table 12.

Example 101

A multi-layer film was obtained in the same manner as in Example 100 except that a coating liquid having the same composition as the aqueous polymerizable monomer composition No. 47 was used in place of the coating liquid having the same composition as the aqueous polymerizable monomer composition No. 46, and evaluation was made in the same manner as described above. The layer structure, EB exposure conditions and oxygen transmission rate are shown in Table 12.

Comparative Examples 32 to 37

Multi-layer films were produced in the same manner as in Example 96 except that respective coating liquids having the same compositions as the aqueous polymerizable monomer compositions Nos. 57 and 62 were used in place of the coating liquid having the same composition as the aqueous polymerizable monomer composition No. 42, and evaluation was made in the same manner as described above. The layer structures, EB exposure conditions, heat treatment conditions and oxygen transmission rates are shown in Table 12.

TABLE 12

| | Layer structure | | | | EB exposure | | | Heat treatment | | Oxygen transmission rate |
|---|---|---|---|---|---|---|---|---|---|---|
| | Base material 1 (support) | Coating liquid: Composition code | Coating liquid: Wet (g/m$^2$) | Base material 2 (Covering material) | Accelerating voltage (kV) | Conveying speed (m/min) | Exposure dose (kGy) | Temp. (° C.) | Time (min) | 30° C./80% RH [cm$^3$ (STP)/m$^2$ · s · MPa] |
| Ex. 95 | PET #12 | No. 41 | 12 | — | 100 | 10 | 50 | 180 | 15 | $7 \times 10^{-4}$ |
| Ex. 96 | PET #12 | No. 42 | 12 | — | 100 | 10 | 50 | 120 | 5 | $28 \times 10^{-4}$ |
| Ex. 97 | PET #12 | No. 43 | 24 | — | 100 | 10 | 50 | 80 | 10 | $38 \times 10^{-4}$ |
| Ex. 98 | Glass plate | No. 44 | 12 | ONy #15 | 250 | 10 | 100 | 70 | 15 | $18 \times 10^{-4}$ |
| Ex. 99 | Aluminum foil | No. 45 | 12 | ONy #15 | 250 | 10 | 100 | 70 | 15– | $14 \times 10^{-4}$ |
| Ex. 100 | OPP #20 | No. 46 | 6 | | 150 | 10 | 100 | — | — | $16 \times 10^{-4}$ |
| Ex. 101 | OPP #20 | No. 47 | 6 | — | 150 | 10 | 100 | — | — | $21 \times 10^{-4}$ |
| Comp. Ex. 32 | PET #12 | No. 57 | 12 | — | 100 | 10 | 50 | 120 | 5 | $1 \times 10^{-2}$ |
| Comp. Ex. 33 | PET #12 | No. 58 | 12 | — | 100 | 10 | 50 | 120 | 5 | $1 \times 10^{-2}$ |

TABLE 12-continued

| | Layer structure | | | | EB exposure | | | Heat treatment | | Oxygen transmission rate |
|---|---|---|---|---|---|---|---|---|---|---|
| | Base material 1 (support) | Coating liquid Composition code | Coating liquid Wet (g/m²) | Base material 2 (Covering material) | Accelerating voltage (kV) | Conveying speed (m/min) | Exposure dose (kGy) | Temp. (° C.) | Time (min) | 30° C./80% RH [cm³ (STP)/m² · s · MPa] |
| Comp. Ex. 34 | PET #12 | No. 59 | 12 | — | 100 | 10 | 50 | 120 | 5 | $1 \times 10^{-2}$ |
| Comp. Ex. 35 | PET #12 | No. 60 | 12 | — | 100 | 10 | 50 | 120 | 5 | $1 \times 10^{-2}$ |
| Comp. Ex. 36 | PET #12 | No. 61 | 12 | — | 100 | 10 | 50 | 120 | 5 | $1 \times 10^{-2}$ |
| Comp. Ex. 37 | PET #12 | No. 62 | 12 | — | 100 | 10 | 50 | 120 | 5 | $1 \times 10^{-2}$ |

(Note)
(1) In Example 98, the oxygen transmission rate was measured after the glass plate was separated after the heat treatment.
(2) In Example 99, the oxygen transmission rate was measured after the aluminum foil was separated after the heat treatment.

As apparent from the results shown in Table 12, the multi-layer films (Examples 95 to 101) according to the present invention are excellent in oxygen gas barrier property.

On the other hand, it is understood that the polymaleic acid film (Comparative Example 32) not ionically crosslinked and the film (Comparative Example 33) containing no unsaturated carboxylic acid are insufficient in oxygen gas barrier property.

The film (Comparative Example 34) containing the polyvalent metal ion in an amount more than the chemical equivalent of the unsaturated carboxylic acid was whitened upon the exposure to precipitate powdery gel. The oxygen gas barrier property of this multi-layer film was poor.

It is understood that the film (Comparative Example 35) insufficient in the ionic crosslinking is insufficient in oxygen gas barrier property.

It is understood that the film (Comparative Example 36) obtained by subjecting the coating liquid low in the solid content concentration to the EB exposure undergoes whitening in its coating film, and the oxygen gas barrier property thereof is insufficient.

The aqueous polymerizable monomer composition No. 62 high in the solid content concentration was a slurry-like solution, and was difficult to be coated. It is understood that the film (Comparative Example 37) formed by using this coating liquid is insufficient in oxygen gas barrier property.

Example 102

Composition No. 48

In distilled water were dissolved 3.00 g of acrylic acid (product of Wako Pure Chemical Industries, Ltd.) and 1.24 g of zinc oxide (product of Wako Pure Chemical Industries, Ltd.), and 0.03 g of ammonium persulfate was added as a heat-polymerization initiator to the resultant solution to obtain an aqueous polymerizable monomer composition No. 48. A polyvalent metal ion in this composition No. 48 was a divalent zinc ion, the content thereof was 0.93 g, and the chemical equivalent of the zinc ion to the carboxyl group of acrylic acid was 0.74. The whole amount of this composition was 7.64 g, the amount of water was 3.40 g (48% by weight), and the solid content concentration in the composition was 52% by weight.

The aqueous polymerizable monomer composition prepared in this Example 102 contains the heat-polymerization initiator.

Example 103

A coating liquid having the same composition as the aqueous polymerizable monomer composition No. 48 prepared above was applied on to a polyethylene terephthalate film (PET #12) by a bar, the coating weight in a wet state of which was 12 g/m², using the table coater. After the application, the surface of the coating film was immediately covered with a biaxially stretched nylon 6 film (ONy #15) to obtain a multi-layer structure having a layer structure of "base material (PET)/coating film in the wet state/base material (ONy)". The multi-layer structure was then heated under conditions of 180° C. and 15 minutes in a Geer oven to obtain a multi-layer film. The oxygen transmission rate of the multi-layer film was $16\times10^{-4}$ cm³(STP)/m²·s·MPa).

This Example 103 is an experimental example where a polymerization treatment by heating was conducted to produce the multi-layer film having an ionically crosslinked polycarboxylic acid polymer layer.

Industrial Applicability

According to the present invention, single-layer or multi-layer gas barrier films excellent in gas barrier properties and good in use as packaging materials can be provided by a simple process. The aqueous polymerizable monomer compositions according to the present invention are excellent in uniform solubility or dispersibility of respective components and can form a coating film having uniform composition and thickness.

A coating film in a wet state formed with the aqueous polymerizable monomer composition according to the present invention is subjected to exposure to an ionizing radiation or heating, whereby a polymerization reaction of the α,β-unsaturated carboxylic acid can be caused to smoothly progress to continuously produce an ionically crosslinked polycarboxylic acid polymer film excellent in gas barrier properties without causing problems of precipitation of gel, whitening, etc. According to the production process of the present invention, there can be provided multi-layer gas barrier films excellent in adhesion between the ionically crosslinked polycarboxylic acid polymer film formed and a base material layer such as another plastic film.

The gas barrier films according to the present invention can be utilized as packaging materials for foods, drinks, drugs, medicines, electronic parts, precision metal parts, etc. that tend to undergo deterioration by oxygen. The gas barrier films according to the present invention can be used for use in the form of packaging bags such as flat pouches, standing pouches, pouches with a nozzle, pillow type bags, gusset bags and shell type packaging bags; and packaging containers such as bottles, caps, trays and tubes.

The invention claimed is:

1. A process for producing a gas barrier film, comprising the following Steps 1 and 2:

(1) Step 1 of applying an aqueous polymerizable monomer composition consisting essentially of an α,β-unsaturated carboxylic acid as a monomer and a polyvalent metal ion in an amount sufficient to neutralize 20 to 82% of a carboxyl group of the α,β-unsaturated carboxylic acid, in the form of a solution or dispersion in water, wherein the amount of water is 30 to 70% by weight based on the whole amount of the composition, on to a base material to form a coating film in a wet state, wherein the α,β-unsaturated carboxylic acid is an unsaturated carboxylic acid compound having a carboxyl group bonded to at least one of two carbon atoms forming an ethylenic carbon-carbon double bond in the unsaturated carboxylic acid; and (2) Step 2 of subjecting the coating film in the wet state to a treatment by exposure to an ionizing radiation or heating, or both ionizing radiation and heating, to polymerize the α,β-unsaturated carboxylic acid and at the same time to ionically crosslink the formed polymer with the polyvalent metal ion, thereby forming an ionically crosslinked polycarboxylic acid polymer film having an oxygen transmission rate of at most $50\times10^{-4}$ $cm^3$(STP)/($m^2$·s·MPa) as measured under conditions of a temperature of 30° C. and a high relative humidity of 80%, which causes neither precipitation of gel nor whitening.

2. The production process according to claim 1, wherein a multi-layer gas barrier film having a layer structure of "base material/ionically crosslinked polycarboxylic acid polymer film" is obtained after Step 2.

3. The production process according to claim 1, wherein a step of separating the base material from the ionically crosslinked polycarboxylic acid polymer film is arranged after Step 2 to obtain a single-layer gas barrier film composed of the ionically crosslinked polycarboxylic acid polymer film.

4. The production process according to claim 1, wherein the base material is an ionizing radiation-transmitting base material.

5. The production process according to claim 4, wherein the ionizing radiation-transmitting base material is a plastic film.

6. The production process according to claim 1, wherein in Step 2, the coating film in the wet state is exposed to the ionizing radiation directly from above the coating film or through the base material, or directly from above the coating film and through the base material.

7. The production process according to claim 1, wherein after the coating film in the wet state is formed on the base material 1 in Step 1, the surface of the coating film is covered with another base material 2, and the coating film with the wet state retained between the base material 1 and the base material 2 is subjected to the treatment by the exposure to the ionizing radiation or the heating or both in Step 2.

8. The production process according to claim 7, wherein a multi-layer gas barrier film having a layer structure of "base material 1/ionically crosslinked polycarboxylic acid polymer film/base material 2" is obtained after Step 2.

9. The production process according to claim 7, wherein a step of separating at least one of the base material 1 and the base material 2 is arranged after Step 2 to obtain a single-layer gas barrier film composed of the ionically crosslinked polycarboxylic acid polymer film or a multi-layer gas barrier film having a layer structure of "base material 1/ionically crosslinked polycarboxylic acid polymer film" or "ionically crosslinked polycarboxylic acid polymer film/base material 2".

10. The production process according to claim 7, wherein at least one of the base material 1 and the base material 2 is an ionizing radiation-transmitting base material.

11. The production process according to claim 10, wherein the ionizing radiation-transmitting base material is a plastic film.

12. The production process according to claim 7, wherein in Step 2, the coating film in the wet state is subjected to the treatment by the exposure to the ionizing radiation through at least one of the base material 1 and the base material 2.

13. The production process according to claim 1, wherein the ionizing radiation is ultraviolet light, electron beam, gamma radiation or alpha radiation.

14. The production process according to claim 13, wherein the treatment by the exposure to the ionizing radiation is a treatment by exposure to ultraviolet light wherein light including a wavelength range of 200 to 400 nm is emitted in an output of 30 to 300 W/cm.

15. The production process according to claim 13, wherein the treatment by the exposure to the ionizing radiation is a treatment by exposure to electron beam wherein accelerated electron beam from an electron beam accelerator of 20 to 2,000 kV is emitted in an exposure dose of 1 to 300 kGy.

16. The production process according to claim 1, wherein the treating by the heating is a heat treatment wherein the coating film is heated at a temperature of 50 to 250° C. for 1 to 120 minutes.

17. The production process according to claim 1, wherein a heat treatment is additionally conducted after Step 2.

18. The production process according to claim 17, wherein the heat treatment after Step 2 is conducted at a temperature of 50 to 250° C. for from 1 second to 60 minutes.

19. The production process according to claim 1, wherein the α,β-unsaturated carboxylic acid consists of acrylic acid and/or methacrylic acid in amount of more than 50% by weight, and, optionally, less than 50% by weight of at least one of crotonic acid, cinnamic acid, senecioic acid, tiglic acid, sorbic acid, maleic acid, fumaric acid, itaconic acid, citraconic acid, mesaconic acid and acid anhydrides thereof.

20. The production process according to claim 1, wherein the polyvalent metal ion is at least one polyvalent metal ion selected from the group consisting of divalent metal ions and trivalent metal ions.

21. The production process according to claim 1, wherein the polyvalent metal ion is a polyvalent metal ion derived from at least one polyvalent metal compound selected from the group consisting of oxides, hydroxides, carbonates, organic acid salts and inorganic acid salts of polyvalent metals.

22. The production process according to claim 21, wherein the polyvalent metal compound is a compound of beryllium, magnesium, calcium, copper, cobalt, nickel, zinc, aluminum, iron or zirconium.

23. The production process according to claim 22, wherein the polyvalent metal compound is at least one divalent metal compound selected from the group consisting of zinc oxide, magnesium oxide, copper oxide, nickel oxide, cobalt oxide, calcium carbonate, calcium lactate, zinc lactate, zinc diacrylate, calcium diacrylate, magnesium diacrylate, copper diacrylate and magnesium methoxide.

24. The production process according to claim 22, wherein the polyvalent metal compound is at least one trivalent metal compound selected from the group consisting of iron(III) oxide and aluminum acrylate.

25. The production process according to claim 1, wherein the aqueous polymerizable monomer composition further comprises a photo-polymerization initiator and/or a heat-polymerization initiator.

* * * * *